United States Patent
Miller et al.

(10) Patent No.: US 11,866,998 B2
(45) Date of Patent: *Jan. 9, 2024

(54) AUTOMATED TELEMETRY FOR SWITCHING TRANSMISSION MODES OF A DOWNHOLE DEVICE

(71) Applicants: ERDOS MILLER, INC., Houston, TX (US); BLACK DIAMOND OILFIELD RENTALS LLC, The Woodlands, TX (US)

(72) Inventors: Kenneth Miller, Houston, TX (US); David Erdos, Houston, TX (US); Abraham Erdos, Houston, TX (US)

(73) Assignees: ERDOS MILLER, INC., Houston, TX (US); DIAMOND OILFIELD RENTALS, LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/109,836

(22) Filed: Dec. 2, 2020

(65) Prior Publication Data

US 2021/0087927 A1    Mar. 25, 2021

Related U.S. Application Data

(63) Continuation of application No. 16/998,079, filed on Aug. 20, 2020.

(Continued)

(51) Int. Cl.
*E21B 47/13* (2012.01)
*H04B 1/401* (2015.01)
(Continued)

(52) U.S. Cl.
CPC .............. *E21B 47/13* (2020.05); *E21B 47/18* (2013.01); *H04B 1/401* (2013.01); *H04B 13/02* (2013.01); *H04Q 9/02* (2013.01)

(58) Field of Classification Search
CPC ......... E21B 47/13; E21B 47/18; H04B 1/401; H04B 13/02; H04Q 9/02
See application file for complete search history.

(56) References Cited

U.S. PATENT DOCUMENTS

| 3,976,347 A | 8/1976 | Cooke et al. |
| 4,872,509 A | 10/1989 | Dickinson et al. |

(Continued)

FOREIGN PATENT DOCUMENTS

| WO | 2002086287 A2 | 10/2002 |
| WO | 2020243103 A1 | 12/2020 |
| WO | 2020243151 A1 | 12/2020 |

OTHER PUBLICATIONS

The International Searching Authority, "Notification of Transmittal of the International Search Report and the Written Opinion of the International Searching Authority" dated Feb. 8, 2021 for International Application No. PCT/US2020/059301, 12 pages.

(Continued)

*Primary Examiner* — Amine Benlagsir
(74) *Attorney, Agent, or Firm* — Dickinson Wright PLLC

(57) ABSTRACT

In some embodiments, a system including a tool drill string having a downhole device is disclosed. The downhole device includes a memory storing instructions and a downhole processor configured to execute the instructions to operate in a first transmission mode by default. The downhole processor is communicatively coupled to an uphole processor via the first transmission mode. The downhole processor is further to transmit, via a second transmission mode, a message to the uphole processor, determine whether a response is received, via the second transmission mode, from the uphole processor, and responsive to determining the response is received from the uphole processor, switch from the first transmission mode to the second transmission mode.

16 Claims, 16 Drawing Sheets

Related U.S. Application Data

(60) Provisional application No. 63/013,199, filed on Apr. 21, 2020.

(51) Int. Cl.
  *H04B 13/02* (2006.01)
  *H04Q 9/02* (2006.01)
  *E21B 47/18* (2012.01)

(56) References Cited

U.S. PATENT DOCUMENTS

| | | |
|---|---|---|
| 5,131,464 A | 7/1992 | Lenhart et al. |
| 5,141,051 A | 8/1992 | Lenhart |
| 5,159,978 A | 11/1992 | Tomek et al. |
| 5,334,801 A | 8/1994 | Mohn |
| 5,820,416 A | 10/1998 | Carmichael |
| 6,519,568 B1 | 2/2003 | Harvey et al. |
| 6,614,718 B2 | 9/2003 | Cecconi et al. |
| 6,791,470 B1 | 9/2004 | Drumheller |
| 6,915,849 B2 | 7/2005 | Nuth |
| 6,985,750 B1 | 1/2006 | Vicknair et al. |
| 7,074,064 B2 | 7/2006 | Wallace |
| 7,506,699 B1 | 3/2009 | Harvey et al. |
| 7,798,216 B2 | 9/2010 | Phillips et al. |
| 8,397,815 B2 | 3/2013 | MacDougall et al. |
| 8,636,549 B2 | 1/2014 | Pratt et al. |
| 9,130,743 B2 | 9/2015 | Levin et al. |
| 9,683,438 B2 | 6/2017 | Fanini et al. |
| 9,960,559 B2 | 5/2018 | Pratt et al. |
| 10,097,517 B2 | 10/2018 | McElwee et al. |
| 10,145,211 B2 | 12/2018 | Santoso et al. |
| 10,669,841 B1 | 6/2020 | Erdos et al. |
| 10,711,530 B1 | 7/2020 | Miller et al. |
| 2002/0060952 A1 | 5/2002 | Cecconi et al. |
| 2002/0113718 A1 | 11/2002 | Wei et al. |
| 2002/0170711 A1 | 11/2002 | Nuth |
| 2003/0151977 A1* | 8/2003 | Shah ............... E21B 47/13 367/82 |
| 2004/0108114 A1 | 6/2004 | Lerche et al. |
| 2004/0234269 A1 | 11/2004 | Laamanen et al. |
| 2005/0026565 A1 | 2/2005 | Goldstein et al. |
| 2005/0051327 A1 | 3/2005 | Vinegar et al. |
| 2005/0207359 A1* | 9/2005 | Hwang ................. 370/278 |
| 2007/0007001 A1 | 1/2007 | Hiron et al. |
| 2008/0136665 A1* | 6/2008 | Aiello ............... E21B 47/12 340/856.3 |
| 2009/0115625 A1* | 5/2009 | Young ............... G01V 11/002 340/854.6 |
| 2009/0289808 A1* | 11/2009 | Prammer ............. E21B 47/07 340/853.7 |
| 2010/0201540 A1* | 8/2010 | Li ..................... G01V 3/18 340/853.1 |
| 2010/0245121 A1 | 9/2010 | Reed et al. |
| 2012/0048552 A1 | 3/2012 | MacDougall et al. |
| 2013/0066560 A1 | 3/2013 | Dyatlov et al. |
| 2013/0093597 A1 | 4/2013 | Stolpman |
| 2013/0147633 A1 | 6/2013 | Sumrall et al. |
| 2013/0168084 A1 | 7/2013 | Conn |
| 2013/0176139 A1 | 7/2013 | Chau et al. |
| 2013/0320664 A1 | 12/2013 | Wium |
| 2015/0240627 A1 | 8/2015 | Gao et al. |
| 2015/0255930 A1 | 9/2015 | Lee |
| 2016/0003035 A1* | 1/2016 | Logan ............... E21B 47/12 340/854.6 |
| 2016/0084076 A1 | 3/2016 | Fanini et al. |
| 2016/0291193 A1 | 10/2016 | Williams |
| 2016/0326867 A1 | 11/2016 | Prammer |
| 2016/0362976 A1 | 12/2016 | Petrovic et al. |
| 2017/0030166 A1* | 2/2017 | Shen ................. E21B 41/0085 |
| 2017/0111112 A1 | 4/2017 | San Martin et al. |
| 2018/0156031 A1 | 6/2018 | Tran et al. |
| 2019/0145243 A1 | 5/2019 | Tubel et al. |
| 2019/0353031 A1 | 11/2019 | Logan et al. |

OTHER PUBLICATIONS

The International Searching Authority, Notification of Transmittal of the International Search Report and the Written Opinion of the International Searching Authority dated Jun. 25, 2020 for International Application No. PCT/US2020/034572, six pages.

The International Searching Authority, Notification of Transmittal of the International Search Report and the Written Opinion of the International Searching Authority dated Aug. 25, 2020 for International Application No. PCT/US2020/034665, nine pages.

\* cited by examiner

AUTOMATED TELEMETRY FOR SWITCHING TRANSMISSION MODES OF A DOWNHOLE DEVICE

CROSS-REFERENCE TO RELATED APPLICATIONS

This application is a continuation of U.S. application Ser. No. 16/998,079, filed Aug. 20, 2020, titled "AUTOMATED TELEMETRY FOR SWITCHING TRANSMISSION MODES OF A DOWNHOLE DEVICE", which claims priority to and the benefit of U.S. Provisional App. No. 63/013,199, filed Apr. 21, 2020, titled "AUTOMATED TELEMETRY FOR SWITCHING TRANSMISSION MODES OF A DOWNHOLE DEVICE". The entire contents of the above-referenced applications are incorporated herein by reference in their entirety for all purposes.

TECHNICAL FIELD

The present disclosure relates to drilling systems. More specifically, the present disclosure relates to automated telemetry for switching transmission modes of a downhole device.

BACKGROUND

Drilling systems can be used for drilling well boreholes in the earth for extracting fluids, such as oil, water, and gas. The drilling systems include a drill string for boring the well borehole into a formation that contains the fluid to be extracted. The drill string includes tubing or a drill pipe, such as a pipe made-up of jointed sections, and a drilling assembly attached to the distal end of the drill string. The drilling assembly includes a drill bit at the distal end of the drilling assembly. Typically, the drill string, including the drill bit, is rotated to drill the well borehole. Often, the drilling assembly includes a mud motor that rotates the drill bit for boring the well borehole.

Obtaining downhole measurements during drilling operations is known as measurement while drilling (MWD) or logging while drilling (LWD). A downhole device, such as an MWD tool, is programmed with information such as which measurements to take and which data to transmit back to the surface while it is on the surface. The downhole device is then securely sealed from the environment and the high pressures of drilling and put into the well borehole. After the downhole device is retrieved from the well borehole, it is unsealed to retrieve data from the downhole device using a computer. To use the downhole device again, the device is sealed and put back into the well borehole. This process of sealing and unsealing the downhole device is time consuming and difficult, and if done wrong very expensive to fix, which increases the cost of drilling the well.

SUMMARY

In one embodiment, a system including a tool drill string having a downhole device is disclosed. The downhole device includes a memory storing instructions and a downhole processor configured to execute the instructions to operate in a first transmission mode by default. The downhole processor is communicatively coupled to an uphole processor via the first transmission mode. The downhole processor is further to transmit, via a second transmission mode, a message to the uphole processor, determine whether a response is received, via the second transmission mode, from the uphole processor, and responsive to determining the response is received from the uphole processor, switch from the first transmission mode to the second transmission mode.

In some embodiments, a method may be performed by the downhole processor executing any of the operations described herein.

In some embodiments, a tangible, non-transitory computer-readable medium may store instructions that, when executed, cause a processing device to perform any of the operations of any of the methods disclosed herein.

While multiple embodiments are disclosed, still other embodiments of the present disclosure will become apparent to those skilled in the art from the following detailed description, which shows and describes illustrative embodiments of the disclosure.

Accordingly, the drawings and detailed description are to be regarded as illustrative in nature and not restrictive.

DETAILED DESCRIPTION

Figure 1:
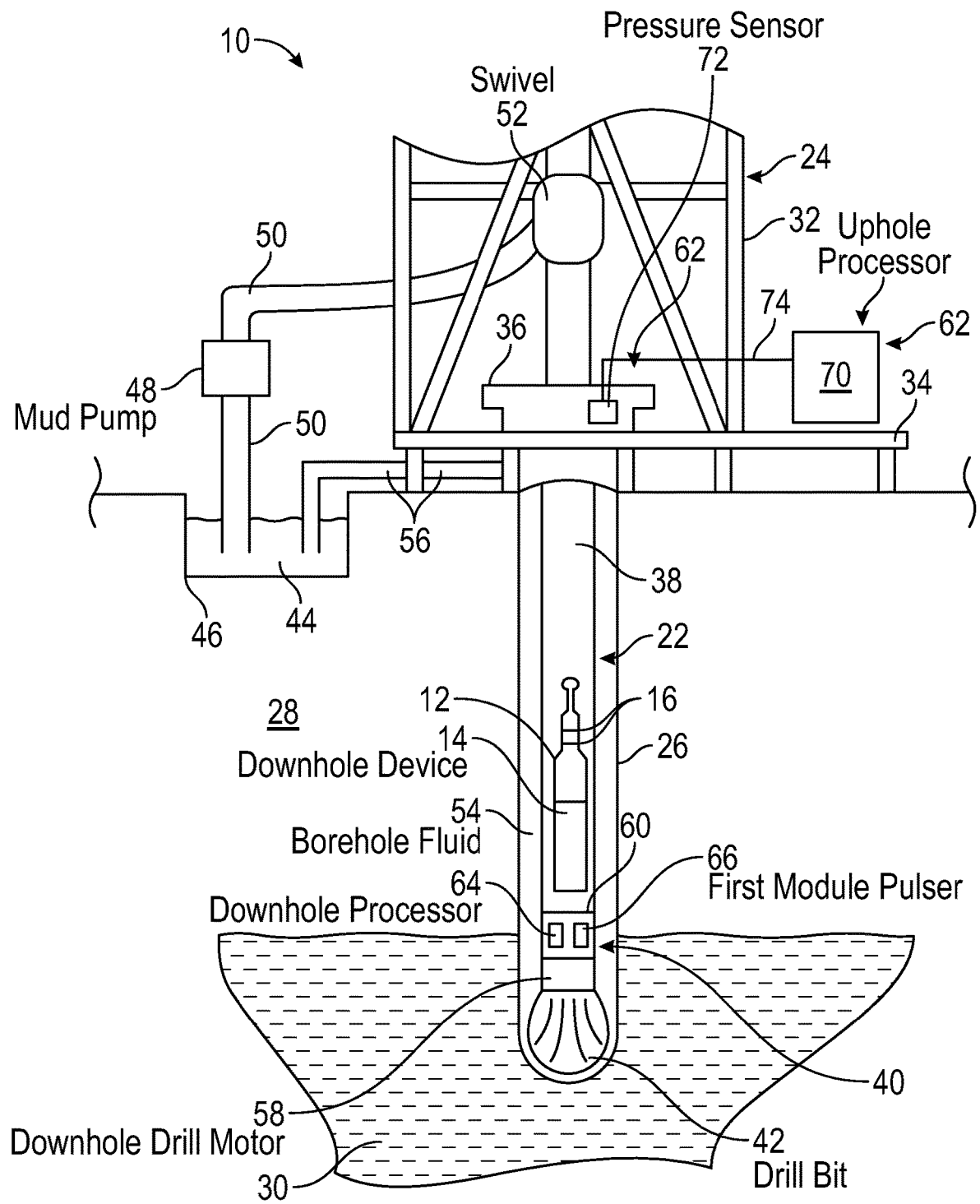
FIG. 1 is a diagram illustrating a system including a contact module configured for communicating with a downhole device, according to embodiments of the disclosure.

The present disclosure describes embodiments of a system for communicating with a device that is configured to be put down a well borehole, i.e., a downhole device. The system is used to communicate with the downhole device at the surface and with the downhole device physically connected in the downhole tool drill string, such as an MWD drill string. The system includes a contact module that is physically and electrically coupled to the downhole device in the downhole tool drill string. The contact module includes at least one external electrical contact that is electrically coupled to the downhole device for communicating with the downhole device through the at least one external electrical contact. The contact module, including the at least one external electrical contact and insulators around the at least one external electrical contact, is pressure sealed to prevent drilling fluid and other fluids from invading the interior of the contact module. This prevents the drilling fluid and other fluids from interfering with communications between the contact module and the downhole device, such as by preventing short circuits in the contact module.

The contact module can be situated anywhere in the downhole tool drill string. In embodiments, the contact module is situated at the proximal end of the downhole tool drill string. In some embodiments, the contact module is a spearpoint contact module situated at the proximal end of the downhole tool drill string and configured for lifting or raising and lowering the downhole tool drill string. In some embodiments, the contact module is situated in the middle of the downhole tool drill string, such that the contact module includes proximal and distal ends configured to be connected to other modules in the downhole tool drill string. In other embodiments, the contact module can be situated at the distal end of the downhole tool drill string. In each of the embodiments, the contact module maintains mechanical integrity in the downhole tool drill string while the downhole tool drill string is lifted or raised and lowered in the well borehole. In various embodiments, the external electrical contacts are integrated into the drilling system, rather than into a distinct contact module. In such an embodiment, for example, the external electrical contacts are integrated into any portion, component, or aspect of the MWD drill string or other downhole device.

Throughout this disclosure, a spearpoint contact module is described as an example of a contact module of the disclosure. While in this disclosure, the spearpoint contact module is used as one example of a contact module, the components, ideas, and concepts illustrated and/or described in relation to the spearpoint contact module can also be and are used in other contact modules, such as contact modules situated in the middle of the downhole tool drill string or other contact modules situated at the proximal or distal end of the downhole tool drill string.

Communicating data between the downhole processor and a surface processor may be performed using various types of telemetry. For example, mud pulse telemetry and/or electromagnetic (EM) telemetry. EM telemetry may be capable of transmitting data at a faster rate than mud pulse telemetry. However, EM telemetry is not as robust as mud pulse telemetry and EM telemetry may fail in certain situations (e.g., deep wells or highly conductive wells). Accordingly, some of the disclosed embodiments provide techniques that leverage the benefits of both forms of telemetry to provide enhanced communications. For example, in some embodiments, a downhole processor may operate in mud pulse mode by default to ensure a connection is maintained with the surface processor. The downhole processor may perform a handshake by transmitting a message via an EM mode, and if the downhole processor receives a corresponding EM response from the surface processor, the downhole processor may switch from a mud pulse mode to the EM mode to leverage the faster data transmission rate. If the EM mode disconnects or the downhole processor determines a certain fluid flow is below a threshold level, the downhole processor may switch back to operating in mud pulse mode. Accordingly, technical benefits of the disclosure may include ensuring connectivity is maintained throughout the process and improving data transmission rates when available.

FIG. 1 is a diagram illustrating a system 10 including a contact module 12 configured for communicating with a downhole device 14, according to embodiments of the disclosure. As shown in FIG. 1, the contact module 12 is a spearpoint. The spearpoint 12 is mechanically and electrically coupled to the device 14 and includes at least one external contact 16 for communicating with the device 14 through the at least one external contact 16. The spearpoint 12 is physically connected to the device 14 and configured for lifting at least the spearpoint 12 and the device 14. The spearpoint 12 is configured to be mechanically strong enough to maintain mechanical integrity while lifting the spearpoint 12 and the device 14.

In embodiments, the device 14 gathers data downhole and stores the data for later retrieval. In embodiments, the device 14 is an MWD tool. In other embodiments, the device 14 is one or more other suitable devices, including devices that gather data downhole.

Examples described herein are described in relation to a spearpoint 12. However, in some embodiments, the mechanical and electrical aspects of the spearpoint 12, including the electrical contact configurations of the spearpoint 12, described herein, can be used in other applications and on other items. In some embodiments, the mechanical and electrical aspects of the spearpoint 12, including the electrical contact configurations of the spearpoint 12, described herein, are or can be used in other contact modules, such as contact modules situated in the middle of the downhole tool drill string or other contact modules situated at the proximal or distal end of the downhole tool drill string.

The system 10 includes a borehole drill string 22 and a rig 24 for drilling a well borehole 26 through earth 28 and into a formation 30. After the well borehole 26 has been drilled, fluids such as water, oil, and gas can be extracted from the formation 30. In some embodiments, the rig 24 is situated on a platform that is on or above water for drilling into the ocean floor.

In one example, the rig 24 includes a derrick 32, a derrick floor 34, a rotary table 36, and the drill string 22. The drill string 22 includes a drill pipe 38 and a drilling assembly 40 attached to the distal end of the drill pipe 38 at the distal end of the drill string 22.

The drilling assembly 40 includes a drill bit 42 at the bottom of the drilling assembly 40 for drilling the well borehole 26.

A fluidic medium, such as drilling mud 44, is used by the system for drilling the well borehole 26. The fluidic medium circulates through the drill string 22 and back to the fluidic medium source, which is usually at the surface. In embodiments, drilling mud 44 is drawn from a mud pit 46 and circulated by a mud pump 48 through a mud supply line 50 and into a swivel 52. The drilling mud 44 flows down through an axial central bore in the drill string 22 and through jets (not shown) in the lower face of the drill bit 42. Borehole fluid 54, which contains drilling mud 44, formation cuttings, and formation fluid, flows back up through the annular space between the outer surface of the drill string 22 and the inner surface of the well borehole 26 to be returned to the mud pit 46 through a mud return line 56. A filter (not shown) can be used to separate formation cuttings from the drilling mud 44 before the drilling mud 44 is returned to the mud pit 46. In some embodiments, the drill string 22 has a downhole drill motor 58, such as a mud motor, for rotating the drill bit 42.

In embodiments, the system 10 includes a first module 60 and a second module 62 that are configured to communicate with one another, such as with the first module 60 situated downhole in the well borehole 26 and the second module 62 at the surface. In embodiments, the system 10 includes the first module 60 situated at the distal end of the drill pipe 38 and the drill string 22, and the second module 62 attached to the drill rig 24 at the proximal end of the drill string 22 at the surface. In embodiments, the first module 60 is configured to communicate with the device 14, such as through a wired connection or wirelessly.

The first module 60 includes a downhole processor 64 and a pulser 66, such as a mud pulse valve, communicatively coupled, such as by wire or wirelessly, to the downhole processor 64. The pulser 66 is configured to provide a pressure pulse in the fluidic medium in the drill string 22, such as the drilling mud 44. The second module 62 includes an uphole processor 70 and a pressure sensor 72 communicatively coupled, such as by wire 74 or wirelessly, to the uphole processor 70.

In some embodiments, the pressure pulse is an acoustic signal and the pulser 66 is configured to provide an acoustic signal that is transmitted to the surface through one or more transmission pathways. These pathways can include the fluidic medium in the drill string 22, the material such as metal that the pipe is made of, and one or more other separate pipes or pieces of the drill string 22, where the acoustic signal can be transmitted through passageways of the separate pipes or through the material of the separate pipes or pieces of the drill string 22. In embodiments, the second module 62 includes the uphole processor 70 and an acoustic signal sensor configured to receive the acoustic signal and communicatively coupled, such as by wire or wirelessly, to the uphole processor 70.

Each of the downhole processor 64 and the uphole processor 70 is a computing machine that includes memory that stores executable code that can be executed by the computing machine to perform processes and functions of the system 10. In embodiments, the computing machine is one or more of a computer, a microprocessor, and a micro-controller, or the computing machine includes multiples of a computer, a microprocessor, and/or a micro-controller. In embodiments, the memory is one or more of volatile memory, such as random access memory (RAM), and non-volatile memory, such as flash memory, battery-backed RAM, read only memory (ROM), varieties of programmable read only memory (PROM), and disk storage. Also, in embodiments, each of the first module 60 and the second module 62 includes one or more power supplies for providing power to the module.

As illustrated in FIG. 1, the spearpoint contact module 12 is physically connected to the device 14. The spearpoint 12 is made from material that is strong enough for lifting the spearpoint 12 and the device 14 from the well borehole 26 and for otherwise lifting the spearpoint 12 and the device 14. In some embodiments, the spearpoint 12 is made from one or more pieces of metal. In some embodiments, the spearpoint 12 is made from one or more pieces of steel.

The spearpoint 12 includes the at least one external contact 16 that is electrically coupled to the device 14 for communicating with the device 14 through the at least one external contact 16. In embodiments, the at least one external contact 16 is electrically coupled to the device 14 through one or more wires. In embodiments, the at least one external contact 16 is configured to provide one or more of CAN bus communications, RS232 communications, and RS485 communications between the device 14 and a surface processor.

Figure 2A:
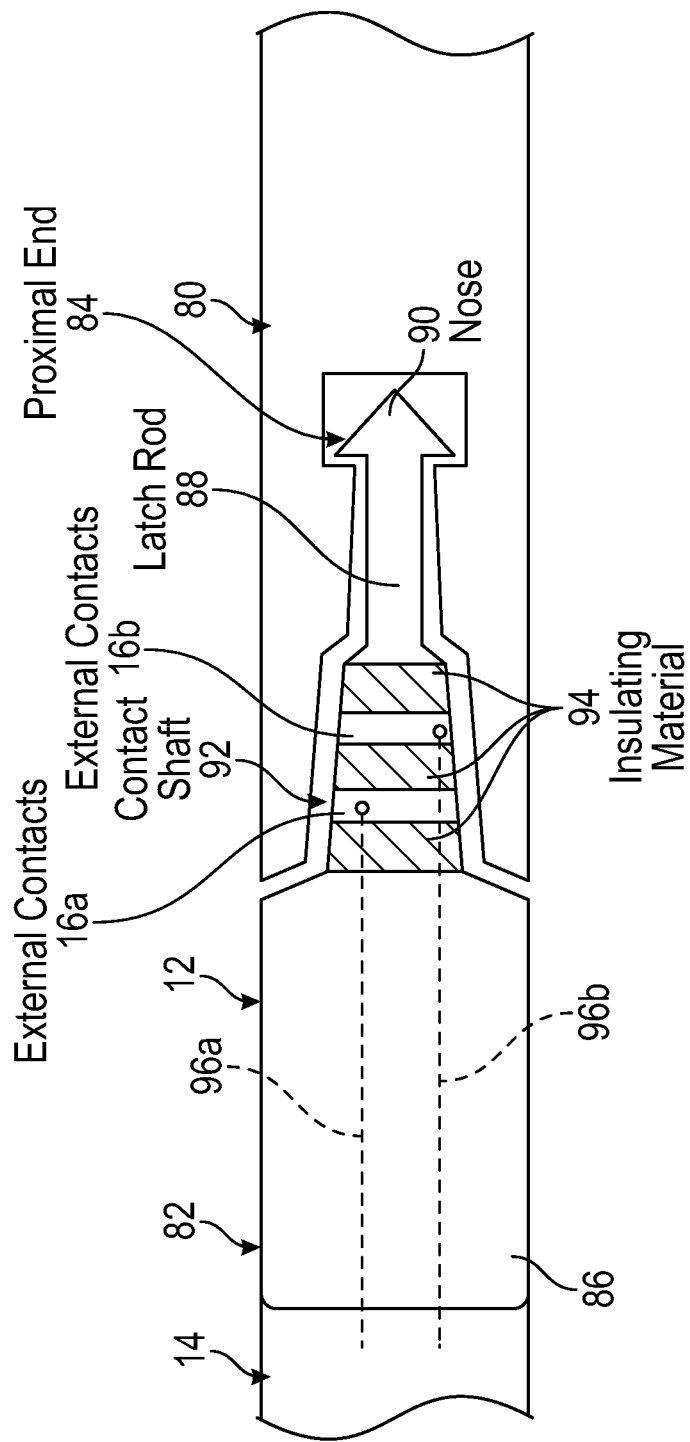
FIG. 2A is a diagram illustrating the spearpoint contact module engaged by an over shot tool for lifting the spearpoint and the device, according to embodiments of the disclosure.

FIG. 2A is a diagram illustrating the spearpoint contact module 12 engaged by an over shot tool 80 for lifting the spearpoint 12 and the device 14, according to embodiments of the disclosure. The spearpoint 12 is configured to be manipulated by a tool, such as a soft release tool, to lower the spearpoint 12 on a cable into the well borehole 26 and to release the spearpoint 22 when the spearpoint 12 has been placed into position. The over shot tool 80 is used to engage the spearpoint 12 to retrieve the spearpoint 12 from the well borehole 26 and bring the spearpoint 12 to the surface. In embodiments, the over shot tool 80 is used for lifting the spearpoint 12 and the device 14 from the well borehole 26 and/or for otherwise lifting the spearpoint 12 and the device 14.

The spearpoint 12 includes a distal end 82 and a proximal end 84. The spearpoint 12 includes an end shaft 86 at the distal end 82 and a latch rod 88 and nose 90 at the proximal end 84. The end shaft 86 is configured to be physically connected to the device 14, and the latch rod 88 and the nose 90 are configured to be engaged by the over-shot tool 80 for lifting the spearpoint 12 and the device 14. In embodiments, the end shaft 86 is configured to be threaded onto or into the device 14. In embodiments, the device 14 is an MWD tool and the end shaft 86 is configured to be threaded onto or into the MWD tool.

The spearpoint 12 further includes a contact shaft 92 situated between the end shaft 86 and the latch rod 88. The contact shaft 92 includes the at least one external contact 16 that is configured to be electrically coupled to the device 14. In this example, the contact shaft 92 includes two annular ring external contacts 16a and 16b that are each configured to be electrically coupled to the device 14 for communicating with the device 14 through the external contacts 16a and 16b. These external contacts 16a and 16b are insulated from each other and from other parts of the spearpoint 12 by insulating material 94. In some embodiments, the external contacts 16a and 16b are configured to be electrically coupled to the device 14 through wires 96a and 96b, respectively. In other embodiments, the spearpoint 12 can include one external contact or more than two external contacts.

Figure 2B:
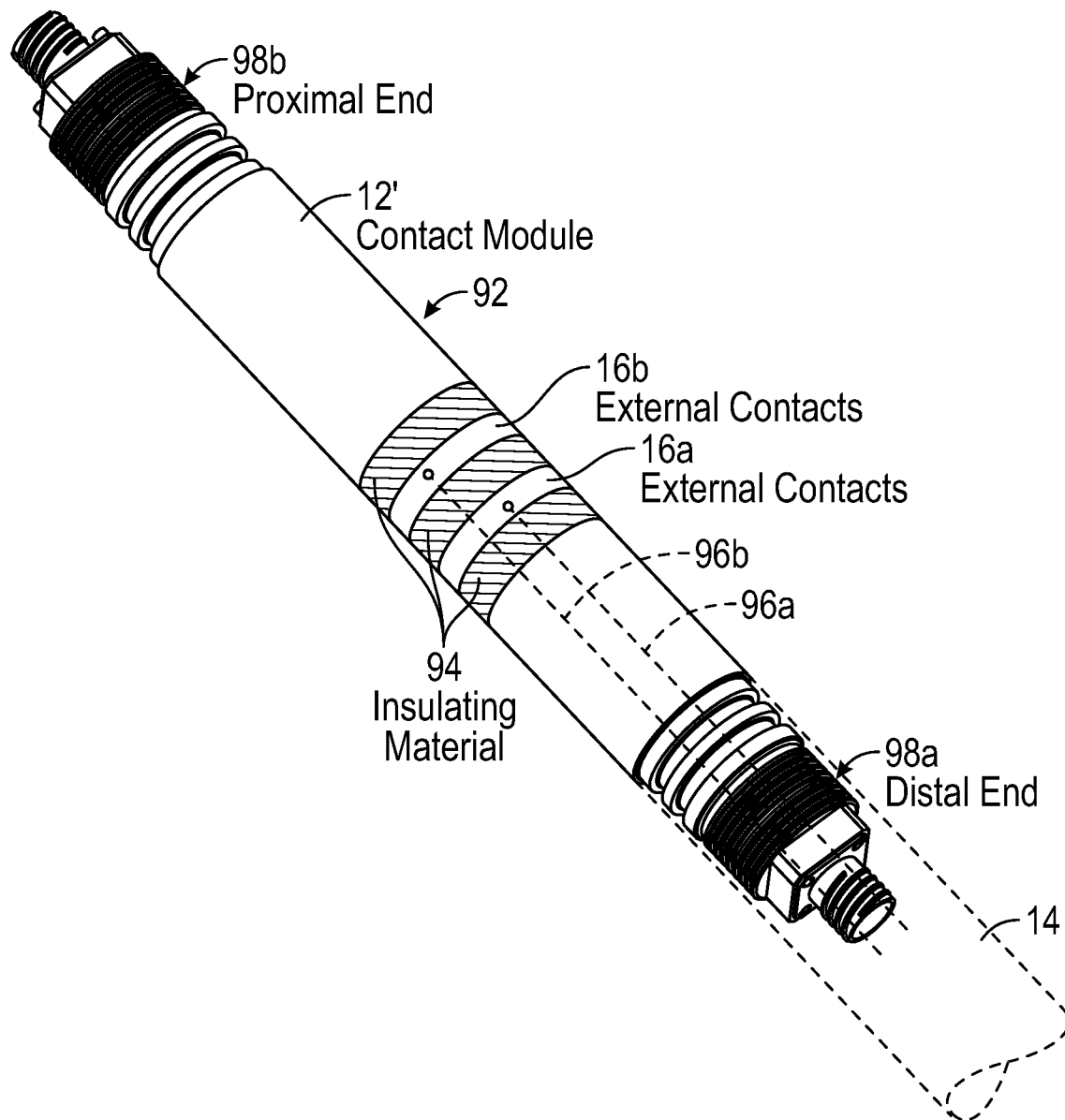
FIG. 2B is a diagram illustrating a contact module that is configured to be situated in the middle of a downhole drill string and for communicating with the downhole device, according to embodiments of the disclosure.

FIG. 2B is a diagram illustrating a contact module 12' that is configured to be situated in the middle of a downhole tool drill string and for communicating with the downhole device 14, according to embodiments of the disclosure. The contact module 12' is another example of a contact module of the present disclosure.

The contact module 12' includes a downhole or distal end 98a and an uphole or proximal end 98b. The distal end 98a is configured to be connected, such as by threads, onto or into the downhole device 14 or onto or into another module of the downhole tool drill string. The proximal end 98b is configured to be connected, such as by threads, onto or into another module of the downhole drill string, such as a retrieval tool. In embodiments, the device 14 is an MWD tool.

The contact module 12' includes a contact shaft 92 situated between the distal end 98a and the proximal end 98b. The contact shaft 92 includes the at least one external contact 16 that is configured to be electrically coupled to the device 14. In this example, the contact shaft 92 includes two annular ring external contacts 16a and 16b that are each configured to be electrically coupled to the device 14 for communicating with the device 14 through the external contacts 16a and 16b. These external contacts 16a and 16b are insulated from each other and from other parts of the contact module 12' by insulating material 94. In some embodiments, the external contacts 16a and 16b are configured to be electrically coupled to the device 14 through wires 96a and 96b, respectively. In some embodiments, the contact module 12' can include one external contact or more than two external contacts.

Figure 3:
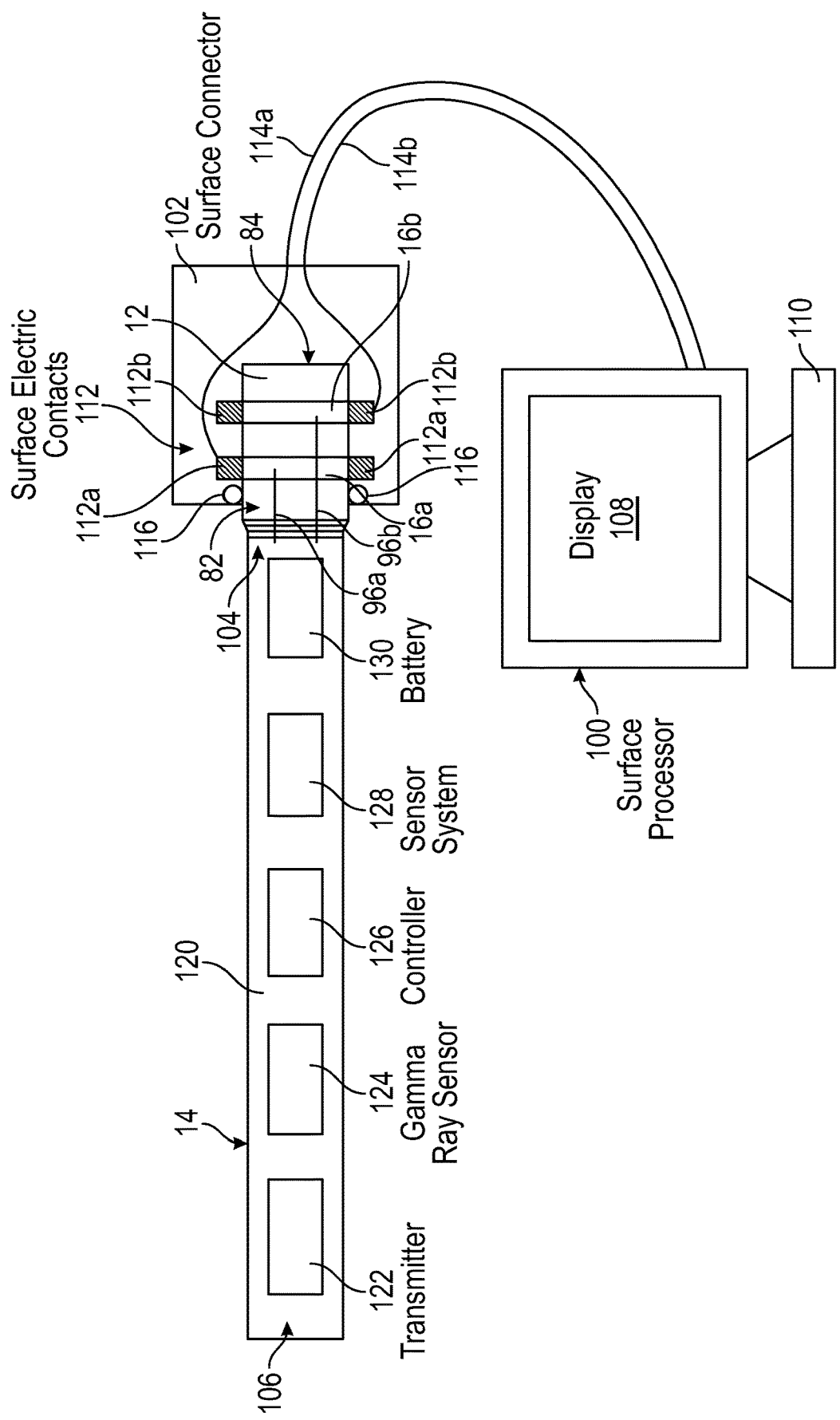
FIG. 3 is a diagram schematically illustrating a surface processor configured to communicate with the device through a surface connector and a contact module, such as a spearpoint or another contact module, according to embodiments of the disclosure.

FIG. 3 is a diagram schematically illustrating a surface processor 100 configured to communicate with a downhole device 14 through a surface connector 102 and a contact module 12, such as a spearpoint or a contact module 12', according to embodiments of the disclosure. The proximal end 84 of the spearpoint 12 is inserted into the surface connector 102 and the distal end 82 of the spearpoint 12 is physically connected, such as by threads, to the proximal end 104 of the device 14. In drilling operations, the proximal end 84 of the spearpoint 12 is situated uphole and the distal end 106 of the device 14 is situated downhole. In other embodiments, the surface connector 102 is configured to engage a different contact module, such as contact module 12', for communicating with the device 14 through the surface connector 102 and the contact module 12'.

The surface processor 100 is a computing machine that includes memory that stores executable code that can be executed by the computing machine to perform the processes and functions of the surface processor 100. In embodiments, the surface processor 100 includes a display 108 and input/output devices 110, such as a keyboard and mouse. In embodiments, the computing machine is one or more of a computer, a microprocessor, and a micro-controller, or the computing machine includes multiples of a computer, a microprocessor, and/or a micro-controller. In embodiments, the memory in the surface processor 100 includes one or more of volatile memory, such as RAM, and non-volatile memory, such as flash memory, battery-backed RAM, ROM, varieties of PROM, and disk storage. Also, in embodiments, the surface processor 100 includes one or more power supplies for providing power to the surface processor 100.

The surface connector 102 is configured to receive the spearpoint 12 and includes at least one surface electrical contact 112 that is electrically coupled to the surface processor 100 and configured to make electrical contact with the at least one external contact 16 on the spearpoint 12. In embodiments, the surface connector 102 includes multiple surface electrical contacts 112 configured to make electrical contact with corresponding external contacts 16 on the contact module, such as the spearpoint contact module 12 or the contact module 12'.

As illustrated in FIG. 3, the surface connector 102 includes two surface electrical contacts 112a and 112b that are insulated from each other and electrically coupled to the surface processor 100 by communications paths 114a and 114b, such as wires. Also, the spearpoint 12 includes two external contacts 16a and 16b that are electrically coupled to the device 14 through communications paths 96a and 96b, such as wires. The two surface electrical contacts 112a and 112b make electrical contact with the two external contacts 16a and 16b of the spearpoint 12, where surface electrical contact 112a makes electrical contact with the external contact 16a and surface electrical contact 112b makes electrical contact with the external contact 16b. Thus, the surface processor 100 is communicatively coupled to the device 14 through communications paths 114a and 114b, the two surface electrical contacts 112a and 112b, the two external contacts 16a and 16b, and communications paths 96a and 96b.

Also, in embodiments, the surface connector 102 includes one or more wiper seals 116 configured to clean the two external contacts 16a and 16b (or the at least one external contact 16) on the spearpoint 12 as the surface connector 102 is coupled onto the spearpoint 12. This wipes the two external contacts 16a and 16b clean prior to making electrical contact with the surface electrical contacts 112a and 112b of the surface connector 102.

In embodiments, the device 14 is an MWD tool 120 enclosed in one or more barrels of an MWD system string. The MWD tool 120 includes one or more of a transmitter 122, a gamma ray sensor 124, a controller 126 such as a directional controller, a sensor system 128 including one or more other sensors, and at least one battery 130. In embodiments, the transmitter 122 includes at least one of a pulser, a positive mud pulser, a negative mud pulser, an acoustic transceiver, an electromagnetic transceiver, and a piezo transceiver. In embodiments, the gamma ray sensor 124 includes at least one of a proportional gamma ray sensor, a spectral gamma ray sensor, a bulk gamma ray sensor, a resistivity sensor, and a neutron density sensor. In embodiments, the controller 126 includes at least one of a processor, power supplies, and orientation sensors.

The MWD tool 120 is configured to acquire downhole data and either transmit the value to the surface or store the downhole data for later retrieval once on the surface. The controller 126 includes a processor that is a computing machine that includes memory that stores executable code that can be executed by the computing machine to perform the processes and functions of the MWD tool 120. In embodiments, the computing machine is one or more of a computer, a microprocessor, and a micro-controller, or the computing machine includes multiples of a computer, a microprocessor, and/or a micro-controller. In embodiments, the memory is one or more of volatile memory, such as RAM, and non-volatile memory, such as flash memory, battery-backed RAM, ROM, varieties of PROM, and disk storage. Also, in embodiments, the controller 126 includes one or more power supplies for providing power to the MWD tool 120. In embodiments, the MWD tool 120 is configured to transmit at least some of the acquired data to the surface via the transmitter 122 when the MWD tool 120 is downhole.

In some embodiments, the MWD tool 120 is equipped with large, commercial grade accelerometers, such as aerospace inertial grade accelerometers, that are highly accurate sensors. Also, in some embodiments, the MWD tool 120 is equipped with fluxgate magnetometers, which are known for their high sensitivity. In some embodiments, the MWD tool 120 is an integrated tool configured to use micro electromechanical system (MEMS) accelerometers and solid-state magnetometers, which require less power and fewer voltage rails than the commercial grade sensors. Also, the MEMS accelerometers and solid-state magnetometers provide for a more compact MWD tool 120 that can be more reliable, durable, and consume less power while still providing the same level of accuracy.

In operation, the surface connector 102 is coupled to the spearpoint 12, such as by sliding the surface connector 102 onto the spearpoint 12. In some embodiments, the surface connector 102 includes the one or more wiper seals 116 that clean the two external contacts 16a and 16b on the spearpoint 12 as the surface connector 102 is slid onto the spearpoint 12. This wipes the two external contacts 16a and 16b clean prior to making electrical contact with the surface electrical contacts 112a and 112b of the surface connector 102.

In some embodiments, after cleaning the two external contacts 16a and 16b by hand or with the one or more wiper seals 116, the two external contacts 16a and 16b are energized or activated for communications with the device 14.

With the surface processor 100 communicatively coupled to the device 14 through the two surface electrical contacts 112a and 112b and the two external contacts 16a and 16b of the spearpoint 12, the surface processor 100 communicates with the device 14 through the surface connector 102 and the spearpoint 12. In some embodiments, communicating with the device 14 includes one or more of CAN bus communications, RS232 communications, and RS485 communications.

Figure 4:
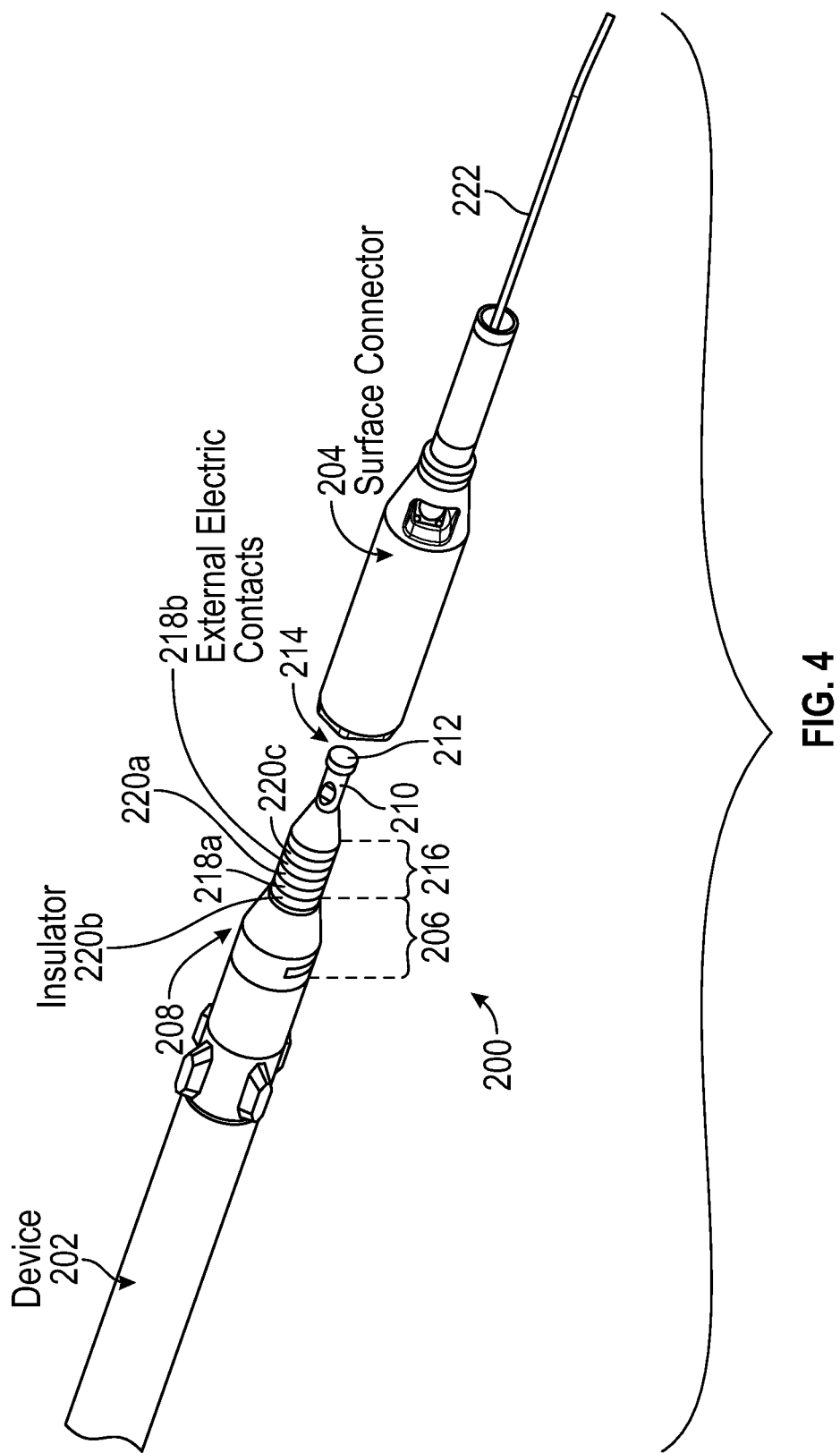
FIG. 4 is a diagram illustrating a spearpoint connected to a device and a surface connector configured to be coupled onto the spearpoint, according to embodiments of the disclosure.

FIG. 4 is a diagram illustrating a spearpoint contact module 200 connected to a device 202 and a surface connector 204 configured to be coupled onto the spearpoint 200, according to embodiments of the disclosure. In some embodiments, the spearpoint 200 is like the spearpoint 12. In some embodiments, the device 202 is like the device 14. In some embodiments, the device 202 is like the MWD tool 120. In some embodiments, the surface connector 204 is like the surface connector 102.

The spearpoint 200 includes an end shaft 206 at a distal end 208 and a latch rod 210 and nose 212 at a proximal end 214, where in drilling operations, the distal end 208 is situated downhole and the proximal end 214 is situated uphole. The end shaft 206 is physically connected to the device 202, and the latch rod 210 and the nose 212 are configured to be engaged by an over-shot tool for lifting the spearpoint 200 and the device 202. In embodiments, the end shaft 206 is configured to be threaded onto or into the device 202. In embodiments, the device 202 includes the MWD tool 120 and the end shaft 206 is configured to be threaded onto or into the MWD tool 120.

The spearpoint 200 includes a contact shaft 216 situated between the end shaft 206 and the latch rod 210. The contact shaft 216 includes two external electrical contacts 218a and 218b that are each configured to be electrically coupled to the device 202 for communicating with the device 202 through the contacts 218a and 218b. In embodiments, one or more of the contacts 218a and 218b is an annular ring electrical contact. In embodiments, the contacts 218a and 218b are electrically coupled to the device 202 through wires. In embodiments, the spearpoint 200 can include one external electrical contact or more than two external electrical contacts.

The contacts 218a and 218b are insulated from each other and from other parts of the spearpoint 200 by insulating material. The contacts 218a and 218b are insulated from each other by insulator 220a that is situated between the contacts 218a and 218b. Also, contact 218a is insulated from the end shaft 206 at the distal end 208 by insulator 220b and contact 218b is insulated from the latch rod 210 and the proximal end 214 by insulator 220c. In embodiments, one or more of the insulators 220a, 220b, and 220c is an annular ring insulator. In embodiments, one or more of the insulators 220a, 220b, and 220c is made from one or more of ceramic, rubber, and plastic.

The surface connector 204 is configured to receive the proximal end 214 of the spearpoint 200, including the latch rod 210 and the nose 212, and the contact shaft 216 of the spearpoint 200. The surface connector 204 includes two or more surface electrical contacts (not shown in FIG. 4) that are electrically coupled to a surface processor, such as surface processor 100, by communications path 222. These two or more surface electrical contacts are configured to make electrical contact with the spearpoint contacts 218a and 218b when the spearpoint 200 is inserted into the surface connector 204. Thus, the surface processor such as surface processor 100 is communicatively coupled to the device 202 through the two or more surface electrical contacts of the surface connector 204 and the two spearpoint contacts 218a and 218b of the spearpoint 200.

Also, in embodiments, the surface connector 204 includes one or more wiper seals that clean the spearpoint contacts 218a and 218b as the surface connector 204 is coupled onto the spearpoint 200. This wipes the spearpoint contacts 218a and 218b clean prior to making electrical contact with the surface electrical contacts of the surface connector 204.

Figure 5:
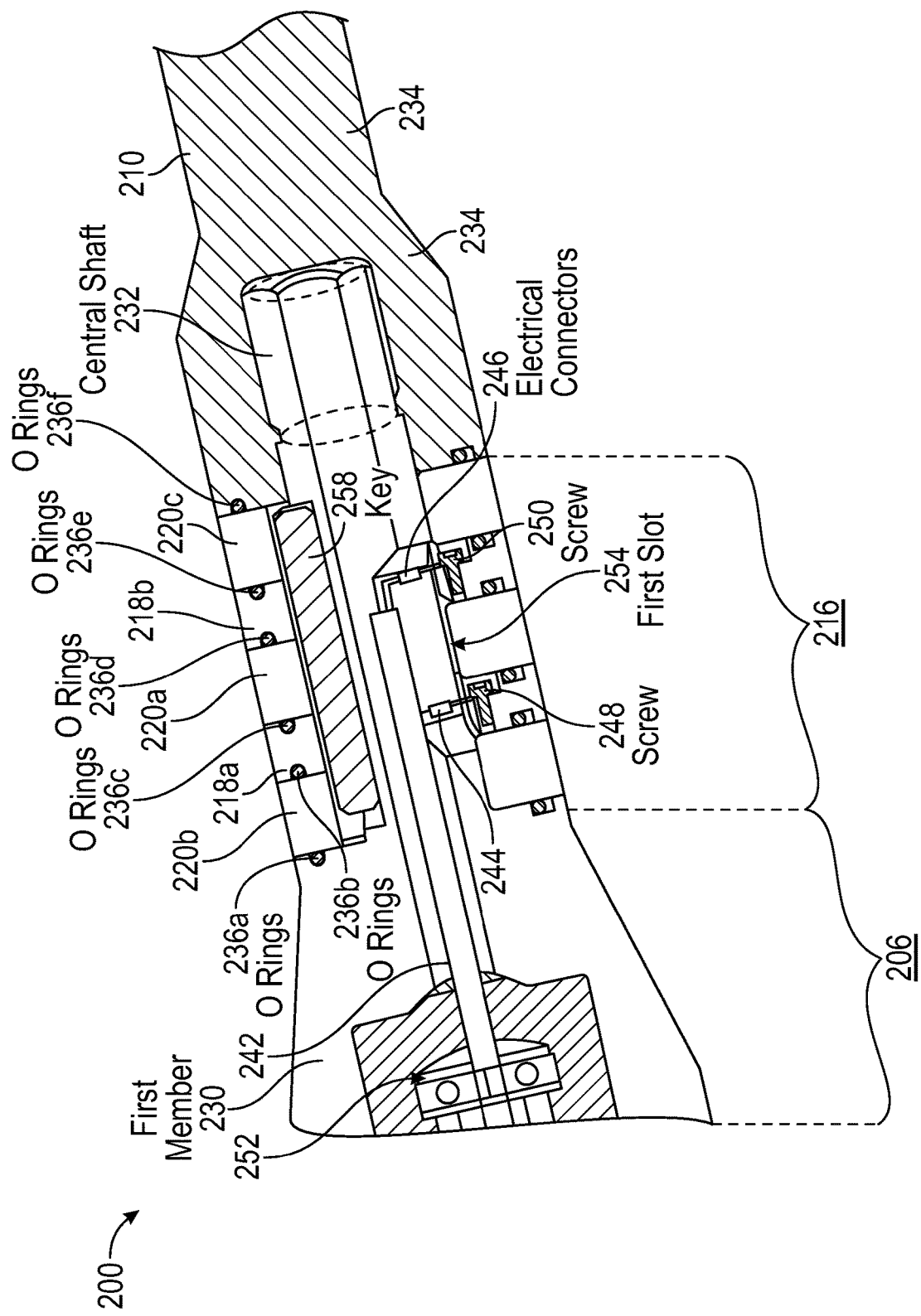
FIG. 5 is a diagram illustrating the spearpoint including at least portions of the end shaft, the contact shaft, and the latch rod, according to embodiments of the disclosure.
Figure 6:
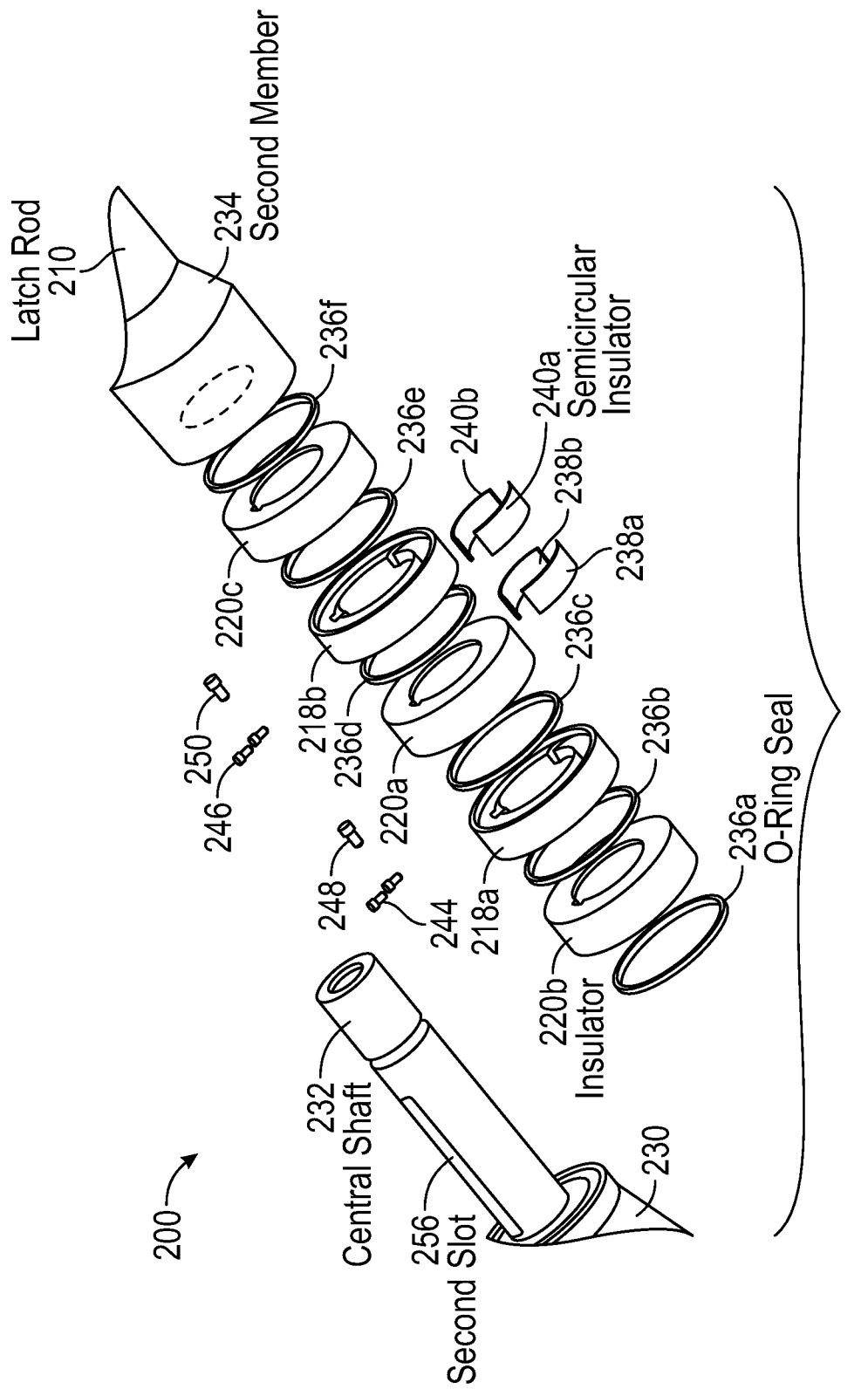
FIG. 6 is an exploded view diagram of the spearpoint shown in FIG. 5, according to embodiments of the disclosure.

FIG. 5 is a diagram illustrating the spearpoint 200 including at least portions of the end shaft 206, the contact shaft 216, and the latch rod 210, according to embodiments of the disclosure, and FIG. 6 is an exploded view diagram of the spearpoint 200 shown in FIG. 5, according to embodiments of the disclosure. As described above, the spearpoint contact module 12 is one example of a contact module of the disclosure, such that the components, ideas, and concepts illustrated and/or described in relation to the spearpoint contact module 12 can also be used in other contact modules, such as contact module 12' configured to be situated in the middle of the downhole tool drill string or other contact modules situated at the proximal or distal end of the downhole tool drill string.

Referencing FIGS. 5 and 6, the end shaft 206 includes a first member 230 that includes a central shaft 232, and the latch rod 210 includes a second member 234. The central shaft 232 of the first member 230 extends through the external electrical contacts 218a and 218b and insulators 220a-220c of the contact shaft 216 and into the second member 234. The central shaft 232 is a tensile load bearing member. The central shaft 232 engages the second member 234, such that the first member 230 and the second member 234 are secured together to maintain mechanical integrity of the spearpoint 200. In embodiments, the central shaft 232 and the second member 234 include threads, such that the central shaft 232 and the second member 234 are threaded together. In embodiments, the first member 230 is made from metal, such as steel. In embodiments, the second member 234 is made from metal, such as steel. In embodiments, the electrical contacts 218a and 218b are made from metal.

The contact shaft 216 is situated between the end shaft 206 and the latch rod 210 and includes the two external electrical contacts 218a and 218b and the three insulators 220a-220c. The contacts 218a and 218b are insulated from each other and from other parts of the spearpoint 200 by the insulators 220a-220c. The contacts 218a and 218b are insulated from each other by insulator 220a that is situated between the contacts 218a and 218b. Also, contact 218a is insulated from the end shaft 206 by insulator 220b, and contact 218b is insulated from the latch rod 210 and the second member 234 by insulator 220c. In embodiments, one or more of the insulators 220a, 220b, and 220c is made from one or more of ceramic, rubber, and plastic.

The contact shaft 216 also includes six o-ring seals 236a-236f that are situated between the contacts 218a and 218b and the insulators 220a-220c, and between insulator 220b and the first member 230, and insulator 220c and the second member 234. The o-rings 236a-236f are configured to resist or prevent fluid from invading through the contact shaft 216 and to the central shaft 232. The contacts 218a and 218b, insulators 220a, 220b, and 220c, and o-rings 236a-236f provide a pressure seal for the spearpoint contact module 12, such that the spearpoint 12 is pressure sealed to prevent drilling fluid and other fluids from invading the contact module. This prevents the drilling fluid and other fluids from interfering with communications between the spearpoint 12 and the downhole device 14, such as by preventing short circuits. In embodiments, one or more of the o-rings 236a-236f is made from one or more of ceramic, rubber, and plastic.

Each of the contacts 218a and 218b is an annular ring electrical contact that is slid over or onto the central shaft 232, and each of the three insulators 220a-220c is an annular ring insulator that is slid over or onto the central shaft 232. Also, each of the o-rings 236a-236f is slid over or onto the central shaft 232.

Electrical contact 218a is further insulated from the central shaft 232 by semicircular insulators 238a and 238b inserted between the electrical contact 218a and the central shaft 232, and electrical contact 218b is further insulated from the central shaft 232 by semicircular insulators 240a and 240b inserted between the electrical contact 218b and the central shaft 232. In embodiments, the semicircular insulators 238a and 238b are made from one or more of ceramic, rubber, and plastic. In embodiments, the semicircular insulators 240a and 240b are made from one or more of ceramic, rubber, and plastic.

The external electrical contacts 218a and 218b are electrically coupled to communications path 242 by electrical connectors 244 and 246, respectively. Electrical contact 218a is electrically coupled to connector 244, which is attached to the electrical contact 218a by screw 248. Electrical contact 218b is electrically coupled to connector 246, which is attached to the electrical contact 218b by screw 250. Each of the electrical connectors 244 and 246 is further electrically coupled to the communications path 242. In embodiments, each of the electrical connectors 244 and 246 is electrically coupled to an individual wire that is further electrically coupled to the device 202. In embodiments, the communications path 242 is connected to the first member 230, such as by a strain relief 252.

The central shaft 232 includes a first slot 254 that provides an opening or path for the connections of the connectors 244 and 246 to the communications path 242. The central shaft 232 includes a second slot 256 that is configured to receive a keying element or key 258. Where, in embodiments, the electrical contacts 218a and 218b are keyed such that the key 258 prevents the electrical contacts 218a and 218b and the central shaft 232 from spinning in relation to one another, which prevents twisting off the connections between the connectors 244 and 246 and the communications path 242. Thus, the first member 230 and the electrical contacts 218a and 218b are keyed to prevent rotation of the first member 230 in relation to the electrical contacts 218a and 218b. In embodiments, the key 258 includes one or more of nylon, ceramic, rubber, and plastic.

Figure 7:
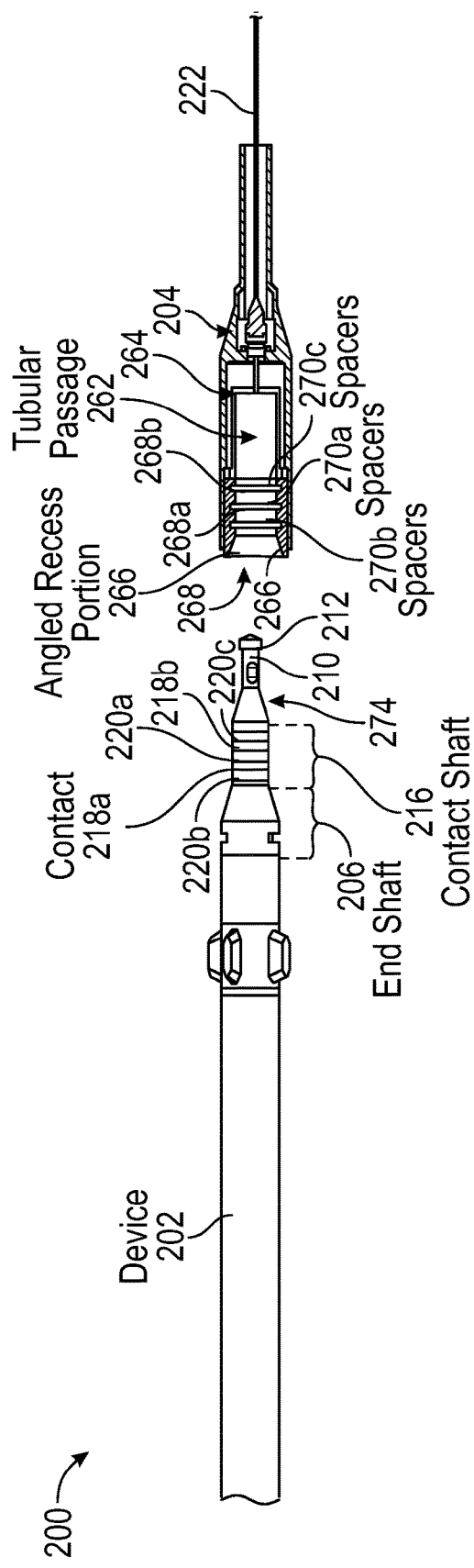
FIG. 7 is a diagram illustrating the spearpoint and the device and a cross-sectional view of the surface connector, according to embodiments of the disclosure.
Figure 8:
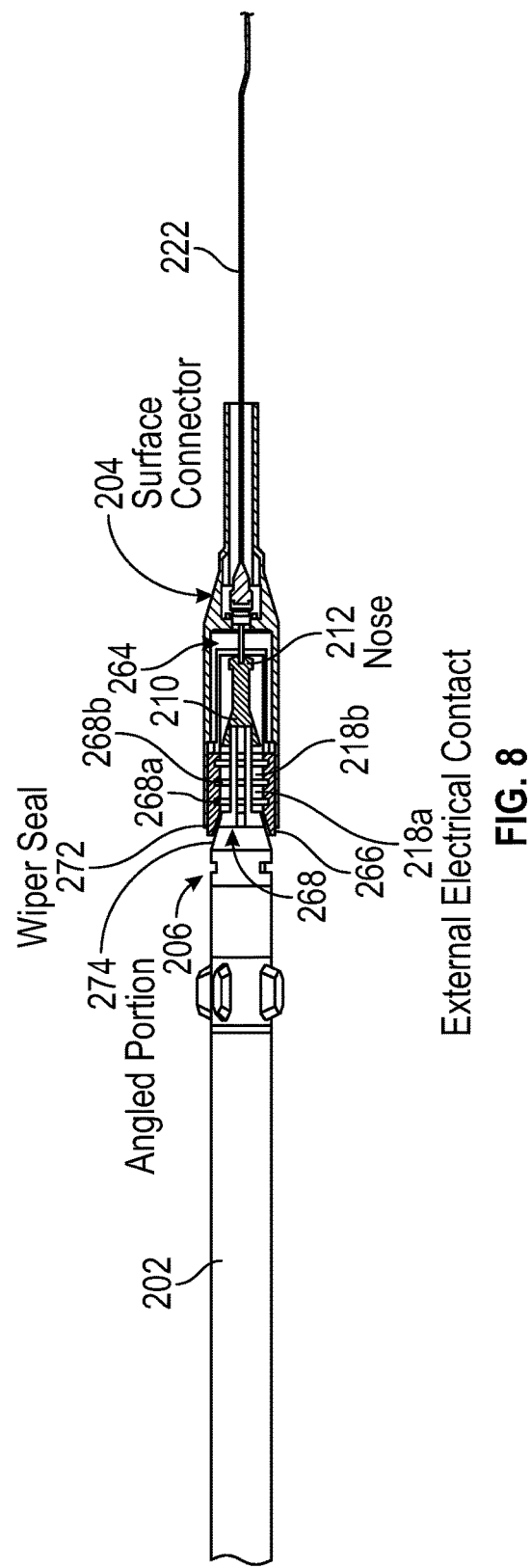
FIG. 8 is a diagram illustrating the spearpoint inserted into the surface connector and/or coupled to the surface connector, according to embodiments of the disclosure.

FIG. 7 is a diagram illustrating the spearpoint 200 and the device 202 and a cross-sectional view of the surface connector 204, according to embodiments of the disclosure. The spearpoint 200 is securely connected to the device 202, such as by threads, and not inserted into or coupled to the surface connector 204 in FIG. 7. FIG. 8 is a diagram illustrating the spearpoint 200 inserted into the surface connector 204 and/or coupled to the surface connector 204, according to embodiments of the disclosure.

Referencing FIGS. 7 and 8, the spearpoint 200 includes the end shaft 206, the contact shaft 216, and the latch rod 210 and nose 212. The end shaft 206 is physically connected to the device 202, and the contact shaft 216 includes the two external electrical contacts 218a and 218b that are each configured to be electrically coupled to the device 202 for communicating with the device 202 through the contacts 218a and 218b. In embodiments, the end shaft 206 is threaded onto or into the device 202. In embodiments, the device 202 includes the MWD tool 120 and the end shaft 206 is threaded onto or into the MWD tool 120. In other embodiments, the spearpoint 200 can include one external electrical contact or more than two external electrical contacts.

The contacts 218a and 218b are insulated from each other by insulator 220a that is situated between the contacts 218a and 218b. Also, contact 218a is insulated from the end shaft 206 at the distal end 208 by insulator 220b, and contact 218b is insulated from the latch rod 210 and the proximal end 214 by insulator 220c.

The surface connector 204 includes a tubular passage 262 configured to receive the latch rod 210, the nose 212, and the contact shaft 216 of the spearpoint 200. The passage 262 receives the nose 212 of the spearpoint 200 at a proximal end 264 of the passage 262, followed by the latch rod 210 and then the contact shaft 216. The surface connector 204 has angled recess portions 266 at a distal end 268 of the passage 262. These angled recess portions 266 rest on angled portions 274 of the end shaft 206 of the spearpoint 200 after or when the spearpoint 200 is inserted into the surface connector 204. In other embodiments, the surface connector 204 can be configured to engage a different contact module, such as contact module 12'.

In the present example, the surface connector 204 includes two surface electrical contacts 268a and 268b that are each electrically coupled to the surface processor, such as surface processor 100, by communications path 222. The surface electrical contacts 268a and 268b are configured to make electrical contact with the spearpoint contacts 218a and 218b when the spearpoint 200 is inserted into the surface connector 204. In embodiments, each of the surface electrical contacts 268a and 268b is an annular ring electrical contact. In embodiments, each of the surface electrical contacts 268a and 268b is sized to make electrical contact with the spearpoint contacts 218a and 218b.

The surface connector 204 further includes three spacers 270a-270c that are beside the surface electrical contacts 268a and 268b. Spacer 270a is situated between the surface electrical contacts 268a and 268b, spacer 270b is situated distal the surface electrical contact 268a, and spacer 270c is situated proximal the surface electrical contact 268b. In some embodiments, one or more of the spacers 270a-270c is an insulator, such as a ceramic, rubber, or plastic insulator. In some embodiments one or more of the spacers 270a-270c is a wiper seal configured to wipe the electrical contacts 218a and 218b clean.

In embodiments, the surface connector 204 includes one or more wiper seals 272 that clean the spearpoint contacts 218a and 218b as the surface connector 204 is coupled onto the spearpoint 200. This wipes the spearpoint contacts 218a and 218b clean prior to making electrical contact with the surface electrical contacts 268a and 268b of the surface connector 204.

In operation, the spearpoint 200 is inserted into the surface connector 204, such that the spearpoint contacts 218a and 218b make electrical contact with the surface electrical contacts 268a and 268b of the surface connector 204. Spearpoint contact 218a makes electrical contact with surface electrical contact 268a, and spearpoint contact 218b makes electrical contact with surface electrical contact 268b. This electrically and communicatively couples the surface processor, such as surface processor 100, to the device 202 through the surface electrical contacts 268a and 268b and the spearpoint contacts 218a and 218b. The surface processor communicates with the device 202, such as by programming the device 202 or downloading data from the device 202. In embodiments, the surface processor and the device 202 communicate using one or more of single line communications, CAN communications, RS232 communications, and RS485 communications.

Figure 9:
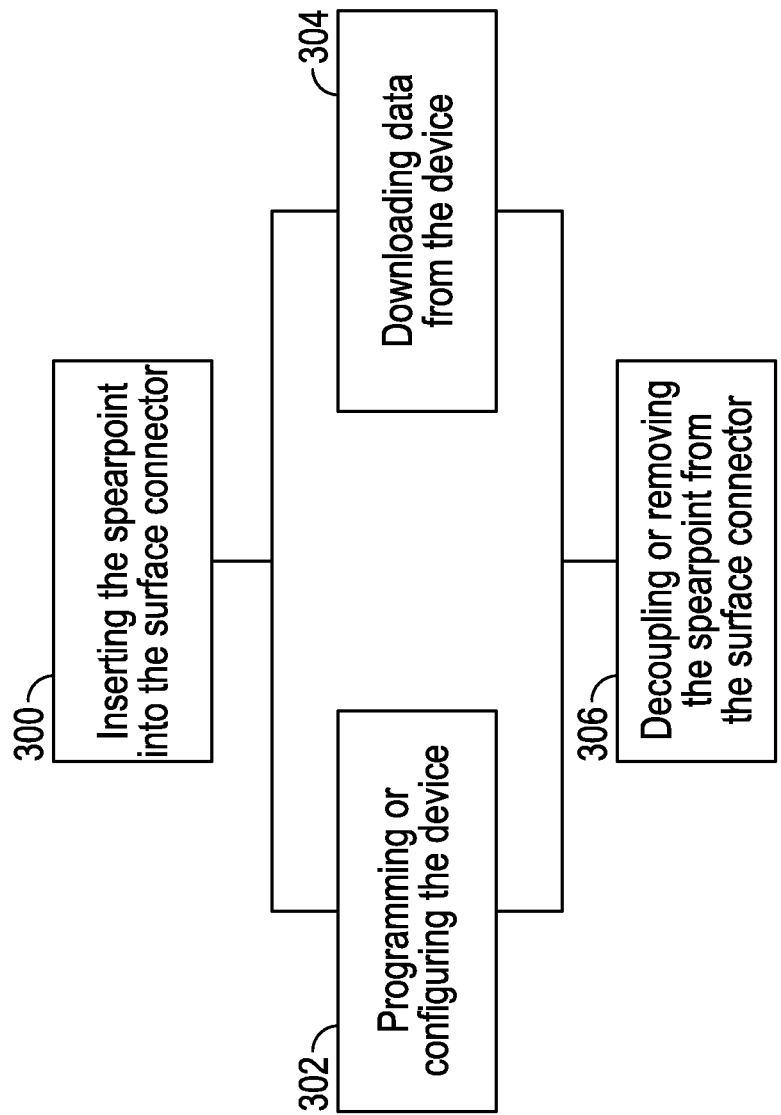
FIG. 9 is a flow chart diagram illustrating a method of communicating with a device, such as a drill string tool, through a contact module, such as a spearpoint contact module, according to embodiments of the disclosure.

FIG. 9 is a flow chart diagram illustrating a method of communicating with a device 202, such as a drill string tool, through a contact module, such as spearpoint contact module 200, according to embodiments of the disclosure. In other example embodiments, the mechanical and electrical aspects of the spearpoint 200, including the electrical contact configurations of the spearpoint 200 described herein can be used in other contact modules, such as contact module 12'. In other example embodiments, the mechanical and electrical aspects of the spearpoint 200, including the electrical contact configurations of the spearpoint 200 described herein can be used in other applications and on other items, such as EM head and rotator connector (wet connect) applications.

To begin, at 300, the method includes inserting the spearpoint 200 into the surface connector 204 at the surface without disconnecting the spearpoint 200 from the device 202.

With insertion, the spearpoint contacts 218a and 218b make electrical contact with the surface electrical contacts 268a and 268b, such that spearpoint contact 218a makes electrical contact with surface electrical contact 268a, and spearpoint contact 218b makes electrical contact with surface electrical contact 268b. The surface connector 204 can be connected to the surface processor either before or after the spearpoint 200 is inserted into the surface connector 204.

This results in the surface processor being electrically and communicatively coupled to the device 202 through the surface electrical contacts 268a and 268b and the spearpoint contacts 218a and 218b. In some embodiments, inserting the spearpoint 200 into the surface connector 204 wipes the spearpoint contacts 218a and 218b clean prior to making electrical contact with the surface electrical contacts 268a and 268b of the surface connector 204.

The surface processor then communicates with the device 202 by performing at least one of programming or configuring the device 202, at 302, and downloading data from the device 202, at 304. In embodiments, the surface processor and the device 202 communicate using one or more of single line communications, CAN communications, RS232 communications, and RS485 communications.

At 306, the spearpoint 200 is decoupled or removed from the surface connector 304, and then returned to normal surface.

Figure 10:
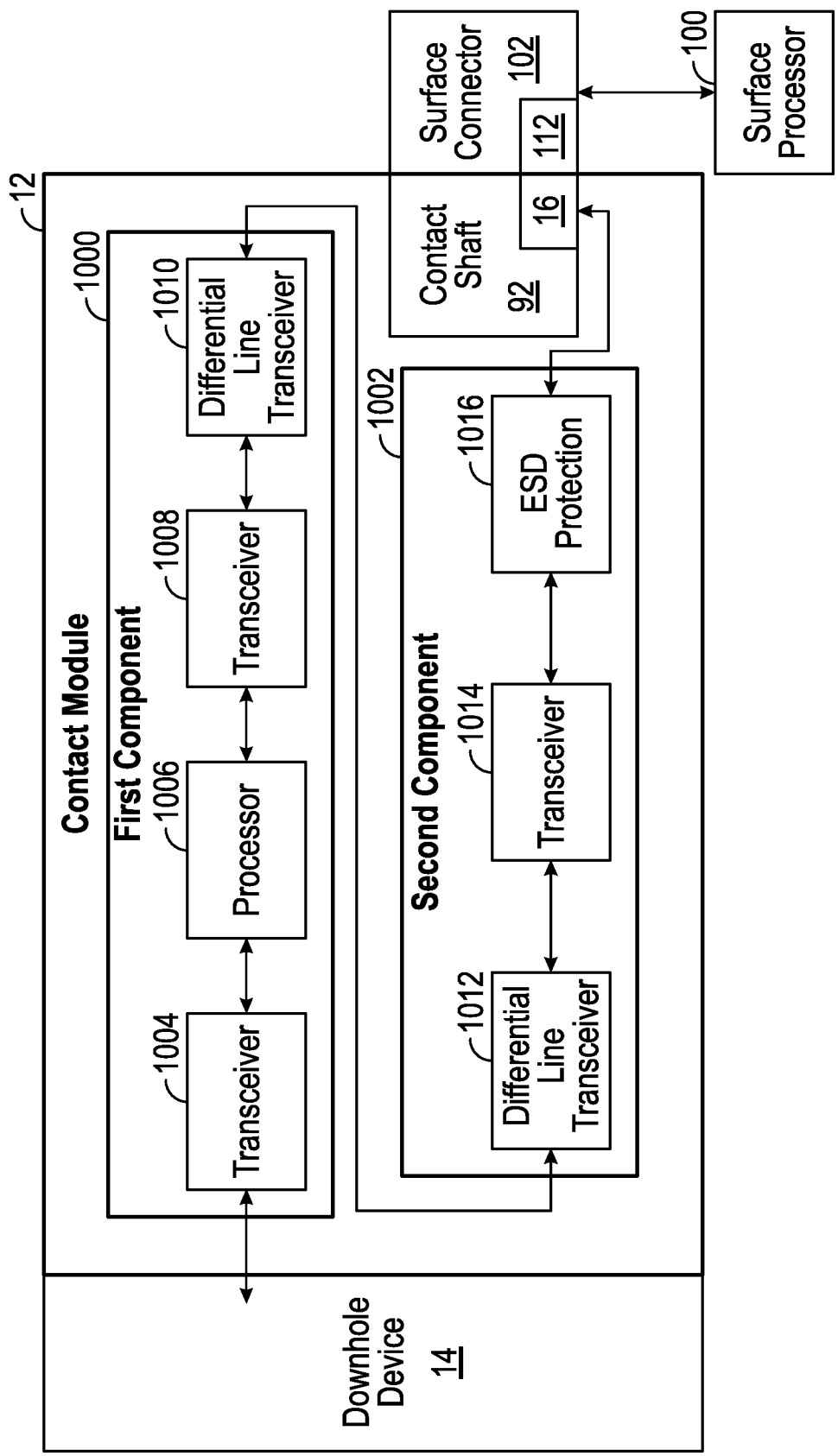
FIG. 10 is a block diagram of various electronic components included in the contact module, according to embodiments of the disclosure.

FIG. 10 is a block diagram of various electronic components included in the contact module 12. It should be noted that the electronic components depicted are for explanatory purposes and fewer or additional electronic components may be included in the contact module 12. It should also be noted that the contact module 12 may be the spearpoint contact module 12 of FIG. 2A or the contact module 12' of FIG. 2B. The contact module 12 may be electrically connected and physically connected to the downhole device 14 (e.g., via threads). Electrically connected may refer to a connection by means of a conducting path or through a capacitor, and may also enable communication of data via the electrical connection. Accordingly, electrically connected may also mean the devices that are electrically connected are also communicatively connected.

As depicted, the contact module 12 includes the contact shaft 92 with at least one external contact 16 (e.g., 16a and 16b) that may be electrically connected to at least one external contact 112 (e.g., 112a and 112b) of the surface connector 102. The electrical connection between the external contacts 16 and 112 may enable communicating data between the contact module 12 and the surface connector 102. For example, the electrical connection may enable the surface connector 102 and the device 14 to communicate data through the contact module 12.

As depicted, the contact module 12 may include one or more electrical components. Each electrical component may include one or more electrical sub-components. In some embodiments, the contact module 12 includes a first component 1000 and a second component 1002. In some embodiments, the first component 1000 and the second component 1002 may each be implemented using a separate circuit board (e.g., printed circuit board). The circuit board(s) may include various integrated circuits. In some embodiments, the first component 1000 and the second component 1002 may be implemented on the same circuit board. For example, the first component 1000 and the second component 1002 may be implemented on the same circuit board but may be isolated in different sections. In some embodiments, the first component 1000 and the second component 1002 may each be implemented on more than one circuit board. The circuit board or circuit boards used to implement the first component 1000 and the second component 1002 may include one or more layers.

The first component 1000 may include the following sub-components: (i) a transceiver 1004 (also referred to as a "first data path" herein), (ii) a processor 1006, (iii) a transceiver 1008 (also referred to as a "second data path" herein), and/or (iv) a differential line transceiver 1010. The transceiver 1005 may be electrically connected to the processor 1006 and the downhole device 14. The processor may be electrically connected to the transceiver 1008, such that the processor 1006 is electrically connected between both the transceivers 1004 and 1008. The transceiver may be further electrically connected to the differential line transceiver 1010.

Each of the transceivers 1004 and 1008 may be capable of communicating data (e.g., receiving data and transmitting data). Each of the transceivers 1004 and 1008 may be an independent bus implemented using RS485, RS232, RS422, FlexRay, Controller Area Network (CAN), CAN Flexible Data-Rate (CANFD), a differential line driver pair, or the like. A differential line driver pair may refer to the type of bus used to connect two devices. Differential signaling is a technique for electrically transmitting information (data) using two complementary signals. The technique may transmit the data as the same electrical signal having a differential pair of signals, each on its own conductor. The pair of conductors may be wires or traces on a circuit board. The differential line driver pair may include a driver and a receiver where the driver converts an input signal (e.g., single-ended) to a differential signal and the receiver receives a differential signal. The driver may also buffer a received differential signal and/or transmit the received differential signal. Differential signals may be used as they are resistant to noise and capable of carrying high-bitrate signals reliably.

Each of the transceivers 1004 and 1008 may be capable of communicating data using a communication protocol. The communication protocol may include RS485, RS232, RS422, FlexRay, Controller Area Network (CAN), CAN Flexible Data-Rate (CANFD), a differential line driver pair, or the like.

In some embodiments, each of the transceivers 1004 and 1008 may communicate data using different communication protocols. For example, the transceiver 1004 may communicate data using CAN as its communication protocol and the transceiver 1008 may communicate data using CANFD as its communication protocol. In some embodiments, the transceivers 1004 and 1008 may communicate data using the same communication protocol.

In some embodiments, the differential line transceiver 1008 may be a combination of the receiver and the driver described above. For example, the driver of the differential line transceiver 1008 may convert an input signal to a line signal. In some embodiments, the driver may generate a differential signal with complementary (+,−) sides. The driver may convert a single-ended signal to a differential signal, buffer a differential signal, or both. The receiver of the differential line transceiver 1008 may receive a differential signal (e.g., line signal) and convert it to an original input signal. For example, the receiver may function as a translator in either unidirectional or bidirectional. Further, the differential line transceiver 1008 may be capable of receiving an input signal (e.g., single-ended, differential, etc.) and transmitting the received signal, either after conversion to another type of signal or as the same type of signal that was received.

Although not depicted, the first component 1000 may include a memory. For example, the memory may be main memory (e.g., read-only memory (ROM), flash memory, solid state drives (SSDs), dynamic random access memory (DRAM) such as synchronous DRAM (SDRAM)), a static memory (e.g., flash memory, solid state drives (SSDs), static random access memory (SRAM)), and/or a data storage device, which communicate with each other and the processor 1006 via a bus. The memory may store computer instructions that implement any of the operations performed by the processor 1006 described herein.

The processor 1006 may be one or more general-purpose processing devices such as a microprocessor, central processing unit, or the like. More particularly, the processor 1006 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1006 may also be one or more special-purpose processing devices such as an application specific integrated circuit (ASIC), a system on a chip, a field programmable gate array (FPGA), a digital signal processor (DSP), network processor, or the like. The processor 1006 is configured to execute instructions for performing any of the operations and/or steps discussed herein.

The processor 1006 may perform networking operations by selectively routing data between the transceiver 1004 and the transceiver 1008. For example, the processor 1006 may route data received from the downhole device 14 via the transceiver 1004 to the transceiver 1008 to be delivered to the surface processor 100 (e.g., computing device external to the contact module 12) via the surface connector 102. In some embodiments, the processor 1006 may route data received from the surface processor 100 via the transceiver 1008 to the transceiver 1004 to be delivered to the downhole device 14.

In some embodiments, the processor 1006 may selectively route the data between the transceiver 1004 and the transceiver 1008 by performing network switching operations. In some embodiments, the network switching operations may include determining whether the data is valid. Determining whether the data is valid may include determining whether the received data includes an invalid address for a device (e.g., downhole device 14, surface processor 100, etc.), a cyclic redundancy check (CRC) failure, a data rate failure, a payload failure, a malicious content identification, or some combination thereof, as described further below.

In some embodiments, responsive to determining the data is valid, the processor 1006 may perform at least one of the following operations: (i) route the data received from the downhole device 14 to be delivered to the surface processor 100 separate from the contact module 12 and the downhole device 14, (ii) route the data received from the surface processor 100 to be delivered to the downhole device 14, or (iv) both.

In some embodiments, responsive to determining the data is invalid, the processor 1006 may perform at least one of the following operations: (i) filter out the data (e.g., ignore corrupt data), or (ii) correct the data using an error-correcting code technique.

The second component 1002 may isolate the external contacts 16 from an internal bus (e.g., at least transceiver 1014) electrically connecting the contact module 12 to the downhole device 14. As such, the second component 1002 may be a terminator capable of preventing the downhole device 14 from short circuiting. The second component 1002 may be directly or indirectly (e.g., via a screw 248 or an electrical connector 244 shown in FIG. 5) electrically connected to the external contact 16 (e.g., using a wire). The second component 1002 may be capable reducing signal reflections (e.g., reduced interference associated with signal loss) and/or power losses.

The second component 1002 may include the following sub-components: (i) a differential line transceiver 1012, (ii) a transceiver 1014 (also referred to as a "third data path" herein), and/or (iv) an electrostatic discharge (ESD) protection component 1016. The transceiver 1016 may be capable of communicating data (e.g., receiving data and transmitting data). The transceiver 1016 may be a bus implemented using RS485, RS232, RS422, FlexRay, Controller Area Network (CAN), CAN Flexible Data-Rate (CANFD), a differential line driver pair, or the like. The transceiver 1014 may be capable of communicating data using a communication protocol. The communication protocol may include RS485, RS232, RS422, FlexRay, Controller Area Network (CAN), CAN Flexible Data-Rate (CANFD), a differential line driver pair, or the like. In some embodiments, the communication protocol used by the transceiver 1016 may be the same or different from the communication protocol used by the transceiver 1004 and/or 1008.

Electrostatic discharge may refer to the sudden flow of electricity between two electrically charged objects caused by contact, an electrical short, or dielectric breakdown. The ESD protection component 1016 may include galvanic isolation, optical isolation, and/or inductive isolation.

The second component 1002 may be electrically coupled to the external contact 16 via the ESD protection component 1016. The ESD protection component 1016 may isolate the transceiver 1014 from the external contact 16. Accordingly, the ESD protection component 1106 may protect the contact module 12 and/or the downhole device 14 when the external contacts 16 and 112 are in contact with each other and current flows between the external contacts 16 and 112. The ESD protection component 1106 may allow data to pass from the surface processor 100 to the downhole device 14 and/or from the downhole device 14 to the surface processor 100 while protecting from ESD.

The differential line transceiver 1012 may include similar components and may perform similar operations as the differential line transceiver 1010 described above. The transceiver 1014 may be electrically connected in between the ESD protection component 1016 and the differential line transceiver 1012. The differential line transceiver 1012 may be electrically connected to the differential line transceiver 1010 of the first component 1000.

The transceiver 1014 may receive data sent from the surface processor 1000 and transmit the data to the differential line transceiver 1012. The data sent from the surface processor 1000 may include any suitable data, such as instructions for the downhole device 14 to program the processor 1006, to perform certain measurements, to transmit data at certain frequency, to transmit data at a certain time, to transmit data at a certain periodicity, and the like.

The differential line transceiver 1012 may transmit the data received from the transceiver 1014 to the differential line transceiver 1010 of the first component 1000. The data may be transmitted to the transceiver 1008, then to the processor 1006 (which may perform various operations and/or processes on the data), then to the transceiver 1004, and then to the downhole device 14.

When data (e.g., MWD measurement data) is transmitted from the downhole data 14, the data is first received by the transceiver 1004 of the first component 1000. The data is then transmitted to the processor 1006 (which may perform various operations and/or processes on the data), then to the transceiver 1008, and then to the differential line transceiver 1010. The data may be transmitted by the differential line transceiver 1010 to the differential line transceiver 1012. The data received at the differential line transceiver 1012 may be transmitted to the transceiver 1014, and then to the surface connector 100 through the ESD protection component 1016 and the external contacts 16 and 112.

The data may include a target address of a device (e.g., either the downhole device 14, the surface processor 100, or any suitable computing device), a source address of the device (e.g., either the downhole device 14, the surface processor 100, or any suitable computing device) sending the data, measurements of characteristics of the formation, measurements of conditions downhole including the movement and location of the drilling assembly contemporaneously with the drilling of the well, or any suitable data. The data may be encrypted by the sending device (e.g., the downhole device 14 or the surface processor 100) using any suitable symmetric and/or asymmetric technique. Accordingly, the processor 1006 may perform any corresponding decryption technique to decrypt the encrypted data upon receipt. The processor 1006 may also perform encryption on the data.

Figure 11:
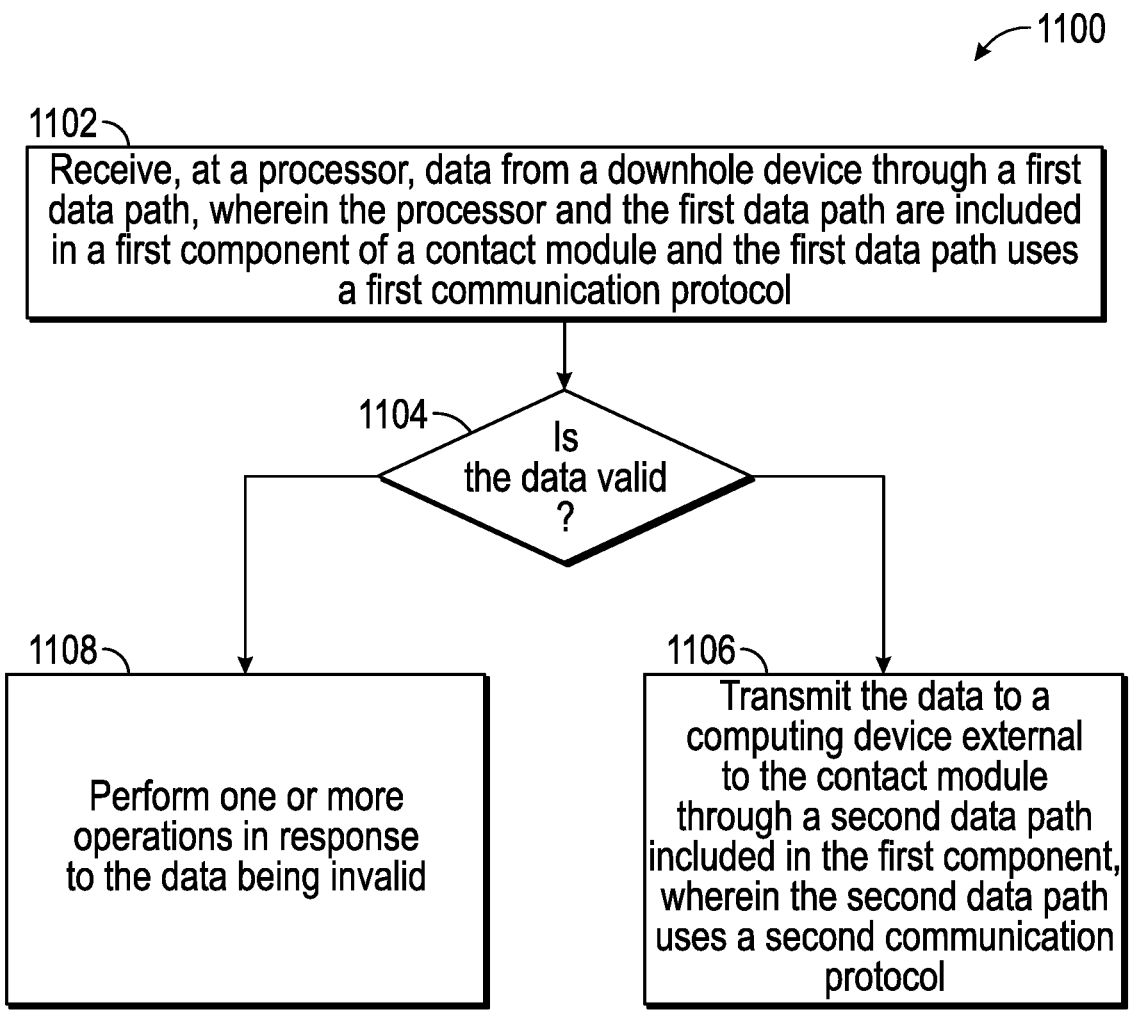
FIG. 11 illustrates example operations of a method for operating the processor as a network switch, according to embodiments of the disclosure.

FIG. 11 illustrates example operations of a method 1100 for operating the processor 1006 as a network switch according to certain embodiments of this disclosure. The method 1100 is performed by processing logic that may include hardware (circuitry, dedicated logic, etc.), software (such as is run on a general purpose computer system or a dedicated machine), firmware, or some combination thereof. The method 1100 and/or each of their individual functions, routines, subroutines, or operations may be performed by one or more processors of a computing device (e.g., the processor 1006 FIG. 10). In certain implementations, the method 1100 may be performed by a single processing thread. Alternatively, the method 1100 may be performed by two or more processing threads, each thread implementing one or more individual functions, routines, subroutines, or operations of the methods.

For simplicity of explanation, the method 1100 is depicted and described as a series of operations. However, operations in accordance with this disclosure can occur in various orders and/or concurrently, and with other operations not presented and described herein. For example, the operations depicted in the method 1100 may occur in combination with any other operation of any other method disclosed herein. Furthermore, not all illustrated operations may be required to implement the method 1100 in accordance with the disclosed subject matter. In addition, those skilled in the art will understand and appreciate that the method 1100 could alternatively be represented as a series of interrelated states via a state diagram or events.

At 1102, the processing 1006 may receive data from the downhole device 14 through a first data path (e.g., transceiver 1004). The processor 1006 and the first data path may be included in the first component 1002 of the contact module 12. The first data path may be a bus and may enable communicating data using a first communication protocol (e.g., CAN, RS485, RS232, RS422, FlexRay, CANFD, or a differential line driver pair). The data may be any suitable data, such as MWD measurement data received from the downhole device 14. The data may be encrypted by the downhole device 14.

In some embodiments, the processor 1006 may receive data from the surface processor 100. The data may be any suitable data, such as instructions that program the downhole device 14 to perform certain measurements, or programs the processor 1006 to perform certain operations. For example, the instructions may instruct the downhole device 14 to perform MWD measurements at a certain frequency, at a certain periodicity, at a certain time, etc. In some embodiments, the instructions may instruct the downhole device 14 to perform measurements pertaining to the formation. In some embodiments, the instructions may instruct the downhole device 14 to perform measurements pertaining to the position, orientation, and/or location of the drilling assembly while the well is being drilled.

At 1104, the processor 1006 may determine whether the data is valid and perform various network switching operations based on whether the data is valid. To determine whether the data is valid, the processor 1006 may perform various analytical techniques on the data. In some embodiments, the processor 1006 may authenticate the data, validate the data, or the like. If the data is encrypted, the processor 1006 may decrypt the data using any suitable decryption technique. For example, if public-private key encryption is used, the processor 1006 may decrypt the data with a private key. The processor 1006 may perform a cyclic redundancy check (CRC). CRC is an error detection mechanism in which a special number is appended by the downhole device 14 and/or the surface processor 100 to a block of data in order to detect any changes introduced during transmission or storage. The special number may be recalculated by the processor 1006 upon receipt and compared to the value originally transmitted. If the values match, there is no error in the data. If the values do not match, then there may be an error in the data.

In some embodiments, if there is an error in the data, the processor 1006 may perform (1108) one or more operations. One operation may include attempting to correct the error. For example, the processor 1006 may use an error correction code (ECC) for controlling errors in data over unreliable or noisy communication channels. The data may be encoded with redundant information in the form of an ECC that is calculated using an algorithm. The redundancy allows the processor 1006 to detect error(s) that may occur anywhere in the data, and to correct the errors without the sender having to retransmit the data. An example of an ECC is to transmit each data bit a certain number of times, which may be referred to as a repetition code. This may enable correcting an error in any of the data that is received by a "majority vote" by comparing the respective data bits together.

In some embodiments, if there is an error in the data, another operation performed by the processor 1006 may include ignoring the data by filtering out the data. In such a case, the processor 1006 may not transmit the data further. The processor 1006 may request the data to be retransmitted from the downhole device 14 and/or the surface processor 100.

Errors in data may occur for various reasons. For example, noisy channels of communication may cause the data bits to change, thereby introducing an error. The data may be invalid if it includes an invalid target device address and/or an invalid source device address. The data may be invalid if the CRC fails and/or ECC fails to correct a detected error. The data may be invalid if there is a data rate failure. For example, if data is not being received, transmitted, and/or processed at a certain data rate, then the data may be deemed invalid. The data may be invalid if there is a payload failure. For example, if not all data in a payload is received within a certain threshold period of time, then the data may be deemed invalid. In some embodiments, if portions of the payload arrive out of order, then the data may be deemed invalid. The data may be invalid if there is malicious content that is identified. For example, malicious content may include any type of suspicious data (e.g., unknown device address, unexpected measurements, etc.).

If the data is valid, the processor 1006 may transmit (1106) the data to a computing device (e.g., surface processor 100) external to the contact module 12 through a second data path (e.g., transceiver 1008). The second data path may be a bus and may use a second communication protocol (e.g., CAN, RS485, RS232, RS422, FlexRay, CANFD, or a differential line driver pair). In some embodiments, the first and second communication protocols may be the same or different. For example, the first communication path may be CAN and the second communication path may be CANFD.

In some embodiments, the processor 1006 may receive data from the second data path 1008 that is sent by the surface processor 100. The processor 1006 may perform various operations on the data and transmit the data to the first data path 1004 to be delivered to the downhole device 14.

In some embodiments, the processor 1006 may encrypt the data using any suitable encryption technique. For example, the processor 1006 may use symmetric encryption with a single key to encrypt the data. The key may be shared with the downhole device 14 and/or the surface processor 100. Asymmetric encryption (public key cryptography) may use two separate keys, one is public and shared with the downhole device 14 and the surface processor 100, and the other key is private. The public key may be used to encrypt the data and the private key is used to decrypt the encrypted data.

In some embodiments, the processor 1006 may decrypt data received from the downhole device 14 or the surface processor 100 to generate decrypted data. The processor 1006 may analyze the decrypted data to determine whether the data is valid. In some embodiments, the processor 1006 may transmit the decrypted data to a target device (e.g., the downhole device 14 or the surface processor 100). In some embodiments, prior to transmitting the decrypted data, the processor 1006 may re-encrypt the data to generate encrypted data. The processor 1006 may transmit the encrypted data to a target device (e.g., the downhole device 14 or the surface processor 100).

Figure 12:
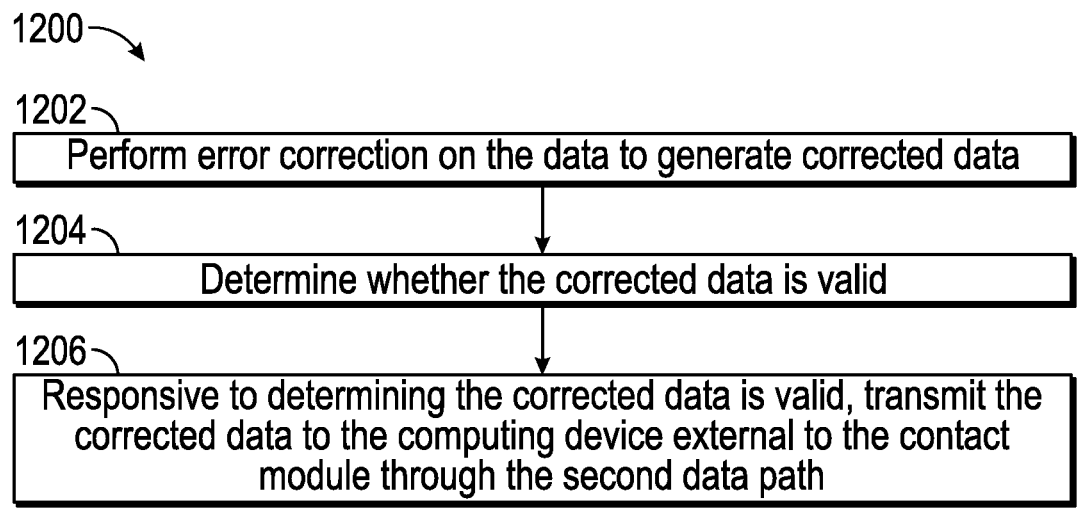
FIG. 12 illustrates example operations of a method for correcting data received from the downhole device or the surface processor that includes errors, according to embodiments of the disclosure.

FIG. 12 illustrates example operations of a method 1200 for correcting data received from the downhole device 14 or the surface processor 100 that includes errors according to certain embodiments of this disclosure. Method 1200 includes operations performed by processors of a computing device (e.g., the processor 1006 of FIG. 10). In some embodiments, one or more operations of the method 1200 are implemented in computer instructions that are stored on a memory device and executed by a processing device. The method 1200 may be performed in the same or a similar manner as described above in regards to method 1100. The operations of the method 1200 may be performed in some combination with any of the operations of any of the methods described herein.

The processor 1006 may receive data from the downhole device 14 or the surface processor 100 and determine the data is invalid. In response to determining the data is invalid, the processor 1006 may perform operations 1202, 1204, and 1206. At 1202, the processor 1006 may perform error correction on the data to generate corrected data. The error correction may be performed using an ECC as described above or any suitable error correction technique.

At 1204, the processor 1006 may determine whether the corrected data is valid. The processor 1006 may determine whether the corrected data is valid using a similar technique as was used to determine whether the original data that was received was valid.

At 1206, responsive to determining the corrected data is valid, the processor 1006 may transmit the corrected data to the computing device (e.g., surface processor 100) external to the contact module 12 through the second data path.

Figure 13A:
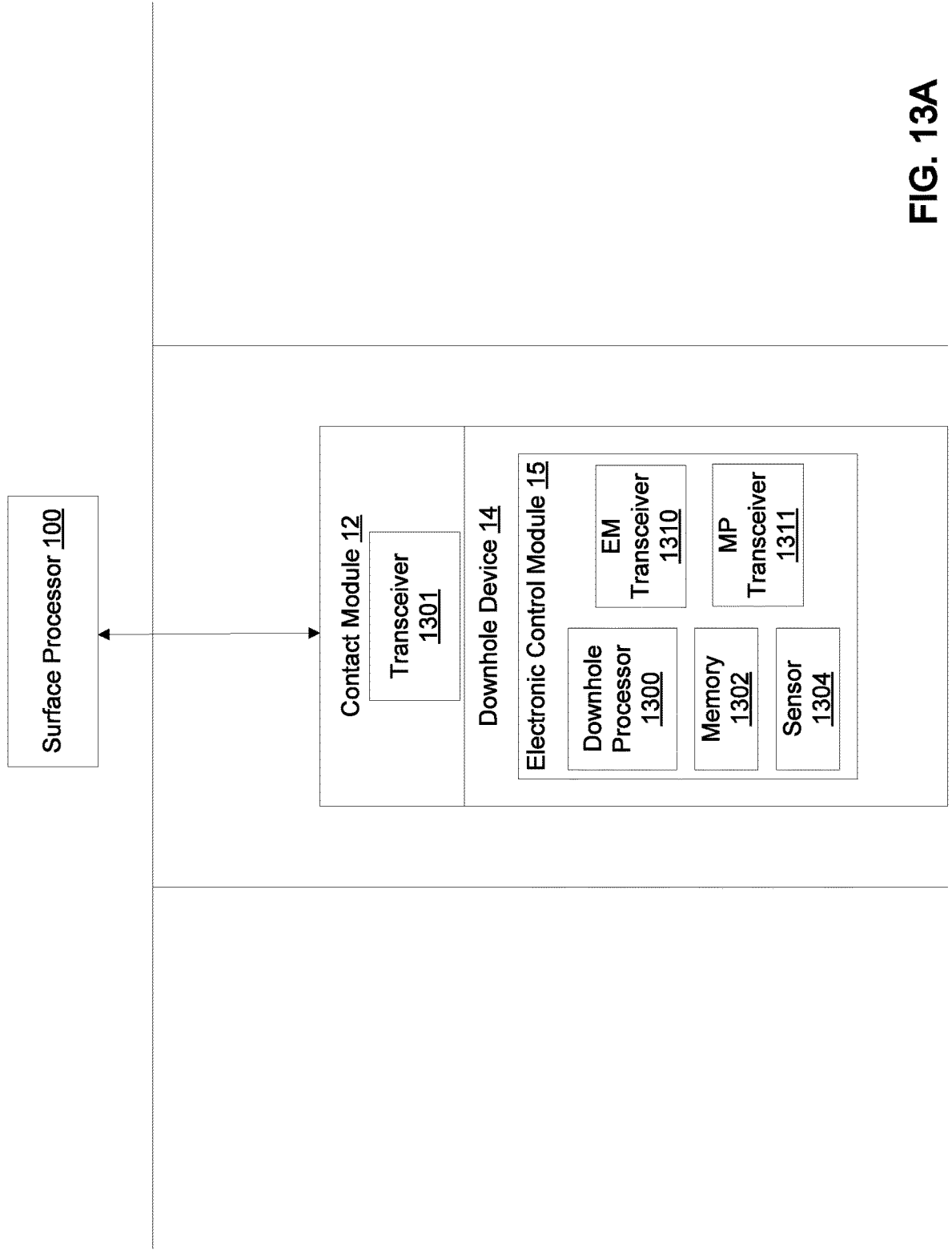
FIG. 13A is a block diagram of various electronic components included in an electronic control module, according to embodiments of the disclosure.

FIG. 13A is a block diagram of various electronic components included in an electronic control module 15, according to embodiments of the disclosure. As depicted, the contact module 12 may be electrically and communicatively coupled with the electronic module 15. The contact module 12 and the electronic control module 15 may be electrically and communicatively coupled with the downhole device 14. The contact module 12 may include a transceiver 1301 that is configured to communicate data with the surface processor 100 when the downhole device 14 is at the surface (e.g., when external contacts of the contact module 12 are engaged with a surface connector 102 (not shown)).

The electronic control module 15 may include various electronic components, such as the downhole processor 1300, a memory 1302, a sensor 1304, an electromagnetic (EM) transceiver 1310, and/or a mud pulse (MP) transceiver 1311. As depicted in FIG. 13A, the EM transceiver 1310 and the MP transceiver 1311 are separate and distinct components in the electronic control module 15. The downhole processor 1300 may be configured to transmit messages via a wireless protocol in various transmission modes. For example, the downhole processor 1300 may command the MP transceiver 1311 to transmit mud pulse messages when the operating in a mud pulse mode. The downhole processor 1300 may command the EM transceiver 1310 to transmit electromagnetic (EM) messages when operating in EM mode. The downhole processor 1300 may operate in mud pulse mode by default. Mud pulse mode is able to operate over a wider range of lithological conditions due to its formation independence. Mud pulse telemetry may refer to a system of using valves to modulate the flow of drilling fluid in a bore of the drillstring. The valve restriction can generate a pressure pulse that propagates up the column of fluid inside the drillstring and then can be detected by pressure transducers at the surface processor 100. The EM mode enables data transmission without a continuous fluid column, providing an alternative to negative and positive pulse systems. An EM telemetry system may refer to a system that applies a differential voltage, positive and negative voltage, across an insulative gap in the drill string. The differential voltage causes current to flow through the formation creating equipotential lines that can be detected by sensors at the surface. Due to the formation dependence, EM communication can be hindered by particularly high and low conductivity environments. Operating in mud pulse mode by default may ensure that a communication link between the downhole processor 1300 and the surface processor 100 is maintained while the device is in operation (e.g., downhole and not at the surface).

The downhole processor 1300 may perform a handshake operation to determine whether an EM channel is available to communicate and switch to the EM mode if the handshake operation is successful. Operating in the EM mode, if available, may be beneficial as it may transfer data at a faster rate than mud pulse mode in certain situations. In some embodiments, the downhole processor 1300 may continue to operate in the first transmission mode (e.g., mud pulse mode) by keeping a mud pulse channel open with the surface processor 100 but may select to transmit messages via the second transmission mode (e.g., EM mode). In some embodiments, when the downhole processor 1300 switches to the second transmission mode, the downhole processor 1300 may select to disconnect a channel of the first transmission mode.

The downhole processor 1300 may be any suitable processing device, such as one or more general-purpose processing devices such as a microprocessor, central processing unit, or the like. More particularly, the downhole processor 1300 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The downhole processor 1300 may also be one or more special-purpose processing devices such as an application specific integrated circuit (ASIC), a system on a chip, a field programmable gate array (FPGA), a digital signal processor (DSP), network processor, or the like. The downhole processor 1300 is configured to execute instructions for performing any of the operations and steps of any of the methods discussed herein. The downhole processor 1300 may operate in several transmission modes. For example, the downhole processor 1300 may be communicatively coupled with the EM transceiver 1310 and/or the MP transceiver 1311 and may use the transceivers 1310 and/or 1311 to operate in the EM mode and/or the mud pulse mode.

The memory 1302 may be any suitable memory device, such as a tangible, non-transitory computer-readable medium storing instructions. The instructions may implement any operation or steps of any of the methods described herein. The downhole processor 1300 may be communicatively coupled to the memory 1302 and may execute the instructions to perform any operation or steps of any of the methods described herein.

The sensor 1304 may be any suitable sensor. In some embodiments, the sensor 1304 may be an accelerometer, velocity sensor, proximity probe, laser displacement sensor, or any suitable sensor configured to measure vibrations. The sensor 1304 may obtain vibration measurements and use them to determine an amount of fluid flow. The sensor 1304 may transmit the vibration measurements to the downhole processor 1300. The downhole processor 1300 and/or the sensor 1304 may be configured to determine the amount of fluid flow based on the measurements. Other techniques for determining fluid flow may be employed by the downhole processor 1300. In some embodiments, the downhole processor 1300 may be configured to switch from the second transmission mode (e.g., EM mode) to the first transmission mode (e.g., mud pulse mode) when the amount of fluid flow is below a threshold amount. When the amount of fluid flow is below the threshold amount, the mud is not being pumped and drilling is not occurring. Such a scenario may be beneficial to switch to the first transmission mode to ensure connectivity with the surface processor 100 is maintained. In some embodiments, the downhole processor 1300 may switch between transmission modes by sending control signals to a respective transceiver (e.g., EM transceiver 1310 or MP transceiver 1311) associated with the desired transmission mode. The control signal may cause a handshake message or any suitable message to be transmitted from the respective transceiver to the surface processor 100. In some embodiments, for example, when an EM response message is received by the EM transceiver 1310 from the surface processor 100, the downhole processor 1300 may switch to operating in the second transmission mode (EM mode).

Figure 13B:
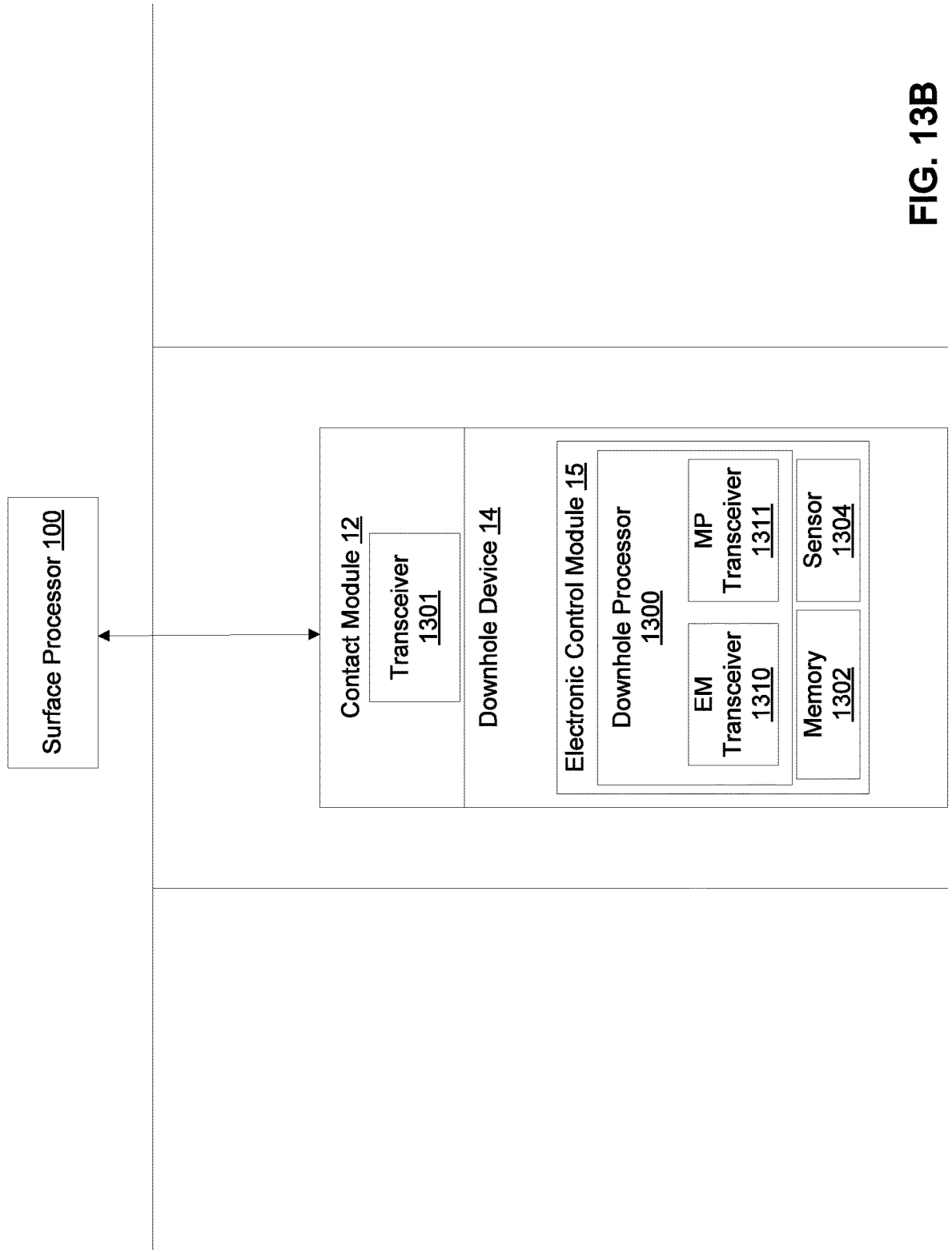
FIG. 13B is another block diagram of various electronic components included in an electronic control module, according to embodiments of the disclosure.

FIG. 13B is another block diagram of various electronic components included in an electronic control module, according to embodiments of the disclosure. The electronic components included in the electronic control module 15 of FIG. 13B are the same as the electronic components included in the electronic control module 15 of FIG. 13A. However, as depicted in FIG. 13A, the EM transceiver 1310 and the MP transceiver 1311 are included as components of the downhole processor 1300 in the electronic control module 15.

Figure 14:
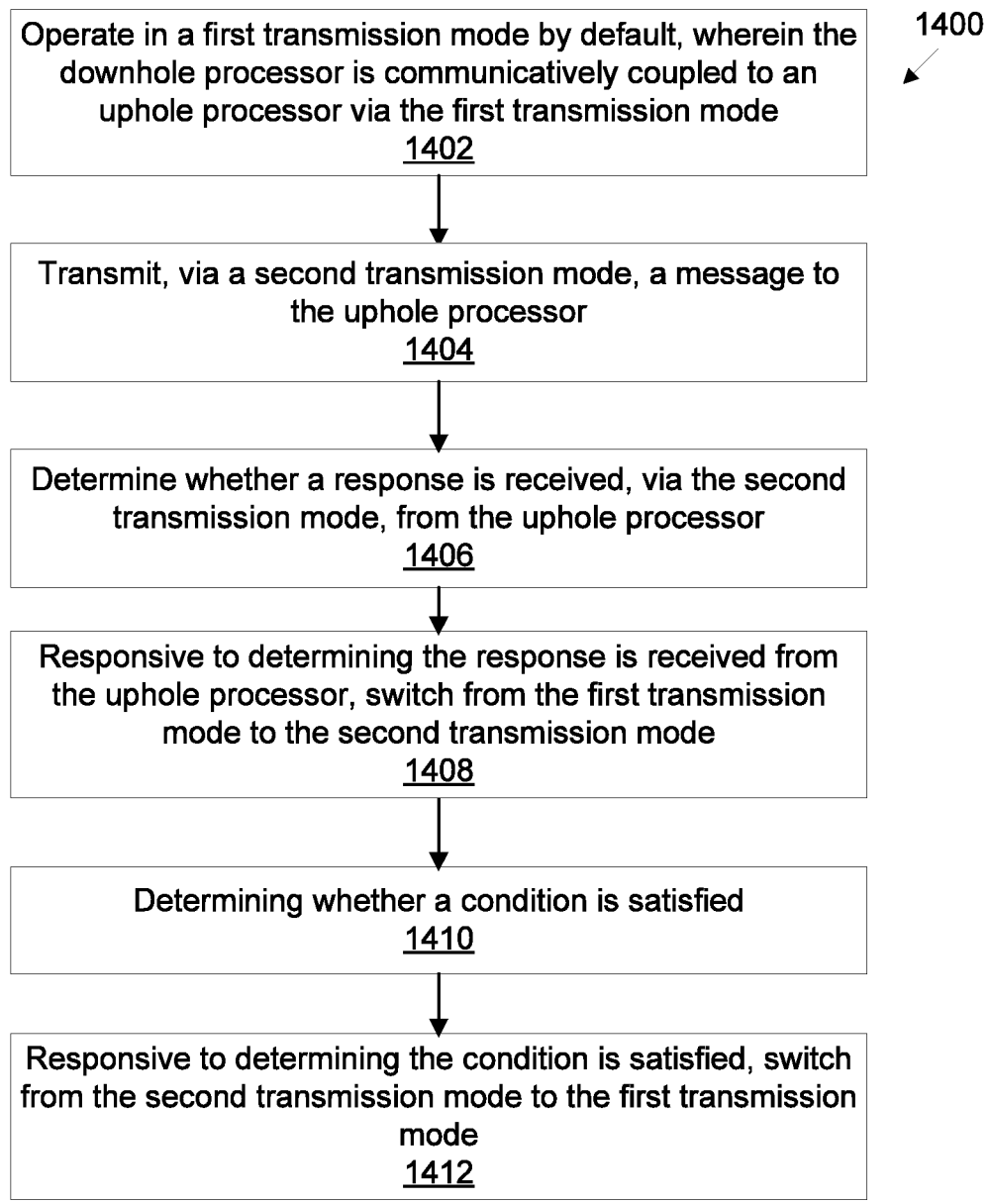
FIG. 14 illustrates example operations of a method for performing a handshake operation to switch transmission modes of a downhole device, according to embodiments of the disclosure.

FIG. 14 illustrates example operations of a method 1400 for performing a handshake operation to switch transmission modes of a downhole device 14, according to embodiments of the disclosure. Method 1400 includes operations performed by processors of a computing device (e.g., the downhole processor 1300 of FIG. 13A, FIG. 13B, and/or the processor 1006 of FIG. 10) and/or transceivers of a computing device (e.g., EM transceiver 1310 and/or MP transceiver 1311 of FIG. 13A, 13B). In some embodiments, one or more operations of the method 1400 are implemented in computer instructions that are stored on a memory device (e.g., the memory 1302) and executed by a processing device. The method 1400 may be performed in the same or a similar manner as described above in regards to method 1100. The operations of the method 1400 may be performed in some combination with any of the operations of any of the methods described herein.

At block 1402, the processing device (e.g., downhole processor 1300) may operate in a first transmission mode by default. The first operating mode may be mud pulse mode. The processing device may be communicatively coupled to an uphole processor (e.g., surface processor 100).

The processing device may generate a message. The processing device may be communicatively coupled to the transceiver 1306 of the contact module 12 and may command the transceiver to send the message using a wireless protocol to the uphole processor. At block 1404, the processing device may transmit, via a second transmission mode (e.g., electromagnetic (EM) mode), a message to the uphole processor. The message may be a handshake message that has a very small data size (e.g., bits, byte) and may not include any information. In some embodiments, the message may be a directional survey message. In some embodiments, the message may include lithological information about the formation in which the downhole tool 14 is located. For example, one or more sensors 1304 of the downhole device 14 may obtain measurements (e.g., rock images, temperature, angle, pressure, flow of fluid (mud), and the like) and those measurements may be included in the message. In some embodiments, the message may include information pertaining to drilling, the well, and/or the drill bit (e.g., angle, direction, temperature, etc.).

There may be several mode "pairs" used in drilling. For example, these can include survey/drilling or survey/sliding/rotating. The sequences contain different information that a driller is interested in during that mode of operation. In a survey/drilling pair, when the mudflow state goes low, the downhole tool 14 takes, using the one or more sensors 1304, a survey sequence (inc, azimuth, dip angle, etc) that is focused on directional values and tool health. When the mudflow state goes high, the downhole tool 14 may transition to a drilling sequence (gamma, toolface) that is focused on lithological information and bit orientation.

At block 1406, the processing device may determine whether a response is received, via the second transmission mode, from the uphole processor. The uphole processor may receive the message and perform a handshake operation by transmitting the response to the processing device. In some embodiments, the response may be an acknowledgement of receiving the message. In some embodiments, the response may include information, such as a configuration instruction that is executed by the processing device to change an operational setting.

At block 1408, responsive to determining the response is received from the uphole processor, the processing device may switch from the first transmission mode to the second transmission mode. In some embodiments, in response to determining the response is not received from the uphole processor, the processing device may continue to operate in the first transmission mode. In some embodiments, the processing device may maintain the channel connection in the first transmission mode even when the processing device switches to the second transmission mode. This may reduce computing resources of switching to the first transmission mode when the condition is satisfied that results in switching back to the first transmission mode from the second transmission mode.

At block 1410, the processing device may determine whether a condition is satisfied. The condition may include whether a mud flow state is less than a threshold. The mud flow state may be determined based on measurements received from the sensor 1304. The condition may include a certain depth of the downhole device. The depth of the downhole device may be sent in a response from the uphole processor. The condition may include a certain amount of time that has expired (e.g., any suitable amount of time that may be configured). The condition may include a connection of a tool drill string being installed. Any combination of the above-described conditions may be used to trigger switching back to the default mode (e.g., first transmission mode).

At block 1412, responsive to determining the condition is satisfied, the processing device may switch from the second transmission mode to the first transmission mode. In some embodiments, the processing device may maintain a channel connection in the second transmission mode even when the processing device switches to the first transmission mode. In some embodiments, the processing device may disconnect the channel connection in the second transmission mode when the processing device switches to the first transmission mode.

Figure 15:
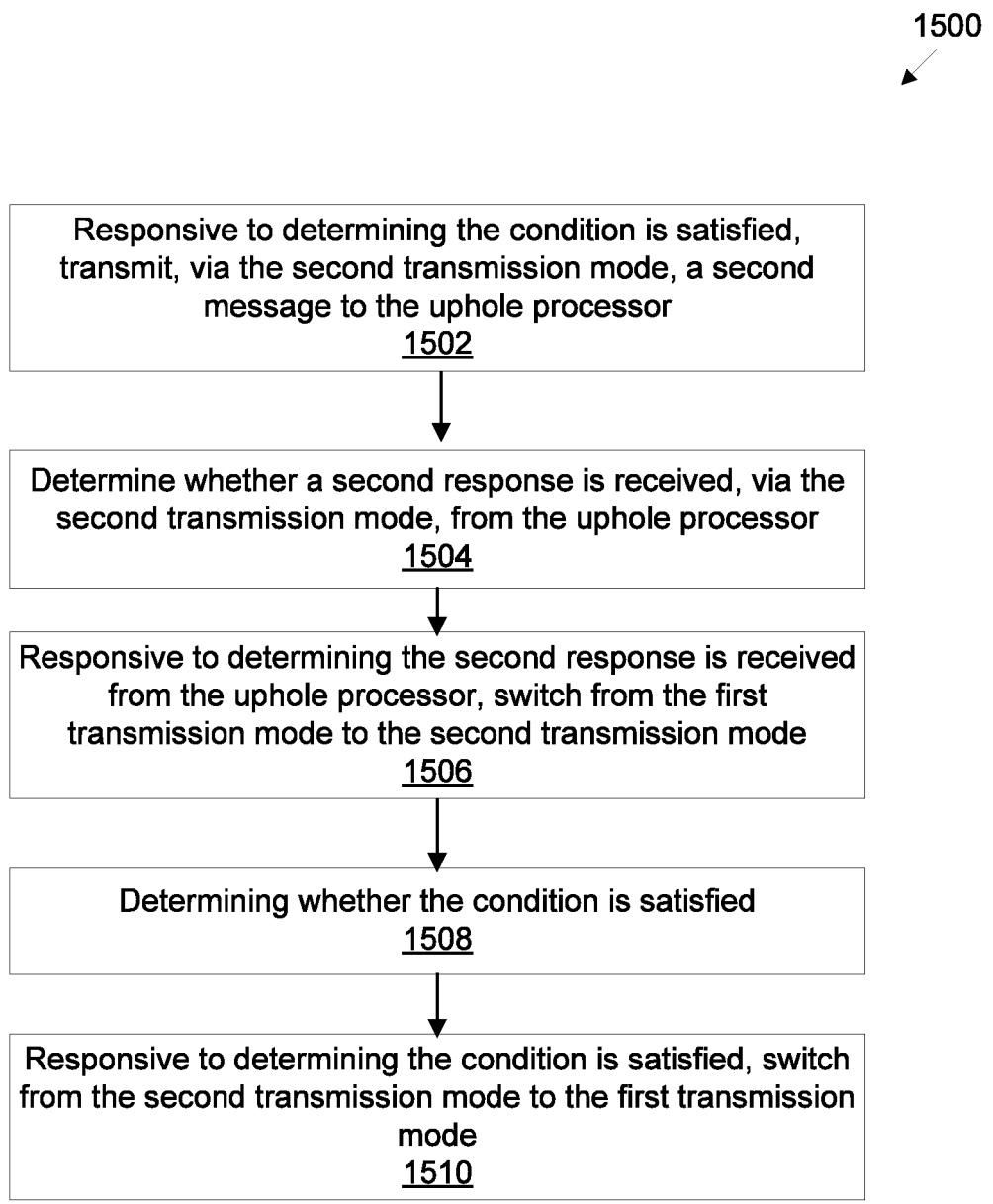
FIG. 15 illustrates example operations of another method for performing a handshake operation to switch transmission modes of a downhole device, according to embodiments of the disclosure.

FIG. 15 illustrates example operations of another method 1500 for performing a handshake operation to switch transmission modes of a downhole device, according to embodiments of the disclosure. Method 1500 includes operations performed by processors of a computing device (e.g., the downhole processor 1300 of FIG. 13A, FIG. 13B, and/or the processor 1006 of FIG. 10) and/or transceivers of a computing device (e.g., EM transceiver 1310 and/or MP transceiver 1311 of FIG. 13A, 13B). In some embodiments, one or more operations of the method 1500 are implemented in computer instructions that are stored on a memory device (e.g., the memory 1302) and executed by a processing device. The method 1500 may be performed in the same or a similar manner as described above in regards to method 1100. The operations of the method 1500 may be performed in some combination with any of the operations of any of the methods described herein.

The operations of method 1500 may be performed in conjunction with and subsequently to operations of the method 1400 in FIG. 14. At block 1502, responsive to determining the condition is satisfied, the processing device may transmit, via the second transmission mode, a second message to the uphole processor. The second message may be an EM message. At block 1504, the processing device may determine whether a second response is received, via the second transmission mode, from the uphole processor. At block 1506, responsive to determining the second response is received from the uphole processor, the processing device may switch from the first transmission mode to the second transmission mode. At block 1508, the processing device may determine whether the condition is satisfied. The condition may be the same condition as described above. At block 1510, responsive to determining the condition is satisfied, the processing device may switch from the second transmission mode to the first transmission mode. This process may continue as the condition is satisfied. That is, each time the condition is satisfied, the processing device may operate in its default transmission mode, which may be the mud pulse mode. In some embodiments, the default mode may be configurable and be any suitable mode (e.g., EM, mud pulse, etc.).

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

The following is claimed:

1. A system including a tool drill string having a downhole device, the system comprising:
    one or more memories storing instructions; and
    one or more uphole processors configured to execute the instructions to:
    communicatively couple, using a mud pulse transmission mode, to at least one or more downhole processors included in the downhole device, wherein at least one of the one or more uphole processors communicatively couples to the at least one of the one or more downhole processors through one or more transceivers included in a first component of a contact module, the first component is coupled to a second component of the contact module, and the second component comprises a terminator that electrically isolates an external contact of the contact module from an internal bus electrically connecting the contact module to the downhole device;
    receive a handshake message sent by the at least one of the one or more downhole processors via an electromagnetic transmission mode different than the mud pulse transmission mode; and
    in response to successfully receiving the handshake message from the at least one of the one or more downhole processors via the electromagnetic transmission mode, transmit, while maintaining a channel with the at least one of the one or more downhole processors via the mud pulse transmission mode, a response message via the electromagnetic transmission mode to the at least one of the one or more downhole processors, wherein the response message causes the at least one of the one of more downhole processors to switch from the mud pulse transmission mode to the electromagnetic transmission mode.

2. The system of claim 1, wherein the at least one of the one or more downhole processors are further to:
    determine whether a condition is satisfied;
        responsive to determining the condition is satisfied, switch from the electromagnetic transmission mode to the mud pulse transmission mode.

3. The system of claim 2, wherein the condition comprises:
    a mud flow state being less than a threshold,
    a depth of the downhole device,
    an amount of time that has expired,
    a connection of the tool drill string being installed, or
    some combination thereof.

4. The system of claim 2, wherein the at least one of the one or more downhole processors are further to:
    responsive to determining the condition is satisfied, transmit, via the electromagnetic transmission mode, a second message to the at least one of the one or more uphole processors;
    determine whether a second response is received, via the electromagnetic transmission mode, from the at least one of the one or more uphole processors; and
    responsive to determining the second response is received from the at least one of the one or more uphole processors, switch from the mud pulse transmission mode to the electromagnetic transmission mode.

5. The system of claim 4, wherein the at least one of the one or more downhole processors are further to:
    determine whether the condition is satisfied; and
    responsive to determining the condition is satisfied, switch from the electromagnetic transmission mode to the mud pulse transmission mode.

6. The system of claim 1, wherein the at least one of the one or more downhole processors are further configured to:
    responsive to determining the handshake message is not received from the at least one of the one or more uphole processors, continue operating in the mud pulse transmission mode.

7. The system of claim 1, wherein the handshake message comprises a directional survey in which the downhole device is located.

8. The system of claim 1, wherein the at least one of the one or more downhole processors are further configured to continue operating in the mud pulse transmission mode after switching to the electromagnetic transmission mode and select to use the electromagnetic transmission mode while the mud pulse transmission mode is unused.

9. A method for operating one or more uphole processors and a downhole device included in a tool drill string, the method comprising:
    communicatively coupling, using a mud pulse transmission mode, at least one of the one or more uphole processors to at least one of one or more downhole processors included in the downhole device, wherein the at least one of the one or more uphole processors communicatively couples to the at least one of the one or more downhole processors through one or more transceivers included in a first component of a contact module, the first component is coupled to a second component of the contact module, and the second component comprises a terminator that electrically isolates an external contact of the contact module from an internal bus electrically connecting the contact module to the downhole device;
    receiving, at the at least one of the one or more uphole processors, a handshake message sent by the at least one of the one or more downhole processors via an electromagnetic transmission mode different than the mud pulse transmission mode;
    in response to successfully receiving the handshake message from the at least one of the one or more downhole processors via the electromagnetic transmission mode, transmitting, while maintaining a channel with the at least one of the one or more downhole processors via the mud pulse transmission mode, a response message via the electromagnetic transmission mode to the at least one of the one or more downhole processors, wherein the response message causes the at least one of the one or more downhole processors to switch from the mud pulse transmission mode to the electromagnetic transmission mode.

10. The method of claim 9, further comprising:
determining whether a condition is satisfied;
responsive to determining the condition is satisfied, switching from the electromagnetic transmission mode to the mud pulse transmission mode.

11. The method of claim 10, wherein the condition comprises:
a mud flow state being less than a threshold,
a depth of the downhole device,
an amount of time that has expired,
a connection of the tool drill string being installed, or some combination thereof.

12. The method of claim 9, further comprising:
responsive to determining a condition is satisfied, transmitting, via the electromagnetic transmission mode, a second message to the at least one of the one or more uphole processors;
determining whether a second response is received, via the electromagnetic transmission mode, from the at least one of the one or more uphole processors; and
responsive to determining the second response is received from the at least one of the one or more uphole processors, switching from the mud pulse transmission mode to the electromagnetic transmission mode.

13. The method of claim 12, further comprising:
determining whether the condition is satisfied;
responsive to determining the condition is satisfied, switching from the electromagnetic transmission mode to the mud pulse transmission mode.

14. The method of claim 9, further comprising:
responsive to determining the handshake message is not received from the at least one of the one or more uphole processors, continuing to operate in the mud pulse transmission mode.

15. The method of claim 9, wherein the handshake message comprises a survey including lithological information of a formation in which the downhole device is located.

16. One or more tangible, non-transitory computer-readable medium storing instructions that, when executed, cause one or more processing devices to:
communicatively couple, using a mud pulse transmission mode, at least one of one or more uphole processors to at least one of one or more downhole processors included in a downhole device, wherein the at least one of the one or more uphole processors communicatively couples to the at least one of the one or more downhole processors through one or more transceivers included in a first component of a contact module, the first component is coupled to a second component of the contact module, and the second component comprises a terminator that electrically isolates an external contact of the contact module from an internal bus electrically connecting the contact module to the downhole device;
receive a handshake message sent by the at least one of the one or more downhole processors via an electromagnetic transmission mode different than the mud pulse transmission mode;
in response to successfully receiving the handshake message from the at least one of the one or more downhole processors via the electromagnetic transmission mode, transmit, while maintaining a channel with the at least one of the one or more downhole processors via the mud pulse transmission mode, a response message via the electromagnetic transmission mode to the at least one of the one or more downhole processors, wherein the response message causes the at least one of the one or more downhole processors to switch from the mud pulse transmission mode to the electromagnetic transmission mode.

* * * * *